United States Patent [19]
Vescovi et al.

[11] Patent Number: 6,151,564
[45] Date of Patent: Nov. 21, 2000

[54] CODED OBJECT SYSTEM AND CODE RECOGNITION METHODS

[75] Inventors: Marcos R. Vescovi; Philippe P. Piernot, both of Palo Alto, Calif.

[73] Assignee: Interval Research Corporation, Palo Alto, Calif.

[21] Appl. No.: 09/017,450

[22] Filed: Feb. 2, 1998

[51] Int. Cl.$^7$ .................................................. G01N 21/00
[52] U.S. Cl. ......................... 702/150; 702/152; 356/348; 348/595; 348/722; 359/568; 359/888
[58] Field of Search .................................. 702/150, 152; 356/348; 348/595, 722; 359/568, 888

[56] References Cited

U.S. PATENT DOCUMENTS

| | | | |
|---|---|---|---|
| 4,062,628 | 12/1977 | Gale | 359/568 |
| 4,341,385 | 7/1982 | Doyle et al. | 273/237 |
| 4,843,568 | 6/1989 | Krueger et al. | 128/18 |
| 5,088,928 | 2/1992 | Chan | 434/339 |
| 5,245,436 | 9/1993 | Alattar | 358/182 |
| 5,330,380 | 7/1994 | McDarren et al. | 446/397 |
| 5,483,261 | 1/1996 | Yasutake . | |
| 5,511,148 | 4/1996 | Wellner | 395/106 |

FOREIGN PATENT DOCUMENTS

| | | |
|---|---|---|
| 91/01543 | 7/1991 | European Pat. Off. . |
| 0576187 A1 | 6/1992 | European Pat. Off. . |
| 0606790A2 | 7/1994 | European Pat. Off. . |
| 2607400 | 11/1986 | France . |
| 3813779A1 | 11/1989 | Germany . |
| 844011 | 7/1979 | U.S.S.R. . |
| 2103943 | 7/1981 | United Kingdom . |
| 2237514 | 5/1991 | United Kingdom . |

OTHER PUBLICATIONS

Wellner, Pierre, Mackay, Wendy, Gold, Rich, Guest Editors, "Computer–Augmented Environments: Back to the Real World Introduction", vol. 36, No. 7, Communications of the ACM, Jul. 1993.

Krueger, Myron W., "Environmental Technology: Making the Real World Virtual", vol. 36, No. 7, Communications of the ACM, Jul. 1993.

Fitzmaurice, George W., "Situated Information Spaces and Spatially Aware Palmtop Computers", vol. 36, No. 7, Communications of the ACM, Jul. 1993.

Azuma, Ronald, "Tracking Requirements for Augmented Reality", vol. 36, No. 7, Communications of the ACM, Jul. 1993.

Feiner, Steven, MacIntyre, Blair, and Seligmann, Dorée "Knowledge–Based Augmented Reality", vol. 36, No. 7, Communications of the ACM, Jul. 1993.

Resnick, Mitchel, "Behavior Construction Kits", vol. 36, No. 7, Communications of the ACM, Jul. 1993.

Weiser, Mark, "Some Computer Science Issues in Ubiquitous Computing", vol. 36 No. 7, Communications of the ACM, Jul. 1993.

Elrod, Scott, Hall, Gene, Constanza, Rick, Dixon, Michael, and des Riviéres, jim, "Responsive Office Environments", vol. 36, No. 7, Communications of the ACM, Jul. 1993.

Wellner, Pierre, "Interacting with Paper on the DigitalDesk", vol. 36, No. 7, Communications of the ACM, Jul. 1993.

Mackay, Wendy, Velay, Gilles, Carter, Kathy, Ma, Chaoying, and Pagani, Daniele, "Augmenting Reality: Adding Computational Dimensions to Paper", vol. 36, No. 7, Communications of the ACM, Jul. 1993.

*Primary Examiner*—Kamini Shah
*Attorney, Agent, or Firm*—Beyer Weaver & Thomas, LLP

[57] ABSTRACT

Disclosed is a method of characterizing a coded object having a plurality of regions. A luminosity value of a first region of the coded object is compared to a luminosity value of a second region of the coded object, wherein the second region's color is known. The first region's color is then determined based on the comparison of the first and second region's luminosity values. In one aspect, the second region's color is known to be white. It is determined that the first region's color is white when the first region's luminosity value is not less than the second region's luminosity value by more than a predetermined constant k, and it is determined that the first region's color is black when the first region's luminosity value is less than the second region's luminosity value by more than a predetermined value. Various coded object configurations are also disclosed.

32 Claims, 15 Drawing Sheets

CODED OBJECT SYSTEM AND CODE RECOGNITION METHODS

CROSS REFERENCE TO RELATED APPLICATIONS

This application claims priority to U.S. patent application Ser. No. 08/675,104 filed Jul. 3, 1995 entitled, "Video Camera Based Computer Input System With Interchangeable Physical Interface" by Piernot, et al., having assignment rights in common with the present invention, and which is herein incorporated by reference. This application is related to U.S. Patent application Ser. No. 09/018,023 filed concurrently herewith, which is incorporated herein by reference for all purposes.

BACKGROUND OF THE INVENTION

This invention relates generally to a coded object system and computer methods for recognizing codes and more particularly to coded objects and code recognition methods within an environment with low lighting, low resolution, and low dynamic range capabilities of the code reader.

Bar-codes are a specific type of coded object and are becoming increasingly popular as a means of identifying objects. Consequently, bar-codes are quickly being introduced into many segments of society. That is, bar-codes are not merely being used to identify grocery store items in a supermarket. For example, bar-codes are now being used by businesses to keep track of documents and by manufacturers to keep track of components within their assembly line.

When one thinks of conventional bar-codes, one initially thinks of bar-codes that are used on product packaging to identify the product type and price, for example. Typically, a product bar-code is in the form of dark lines or "bars" against a light background. The dark bars are arranged in parallel and are of varying width. Typically, a bar-code reader that includes a laser beam is configured to read the bar-code. The width of each bar is determined by calibrating each bar with a particular frequency of the laser beam. The identification of each bar-code is then determined by ascertaining the arrangement of bars and associated widths of the bar-code. A similar type arrangement is used for recognizing business documents.

Although the above-described bar-code system works adequately within the business world, this bar-code system has many limitations. For example, the bar-code must conform to a set of strict size and shape requirements. Also, the bar-code must be positioned directly under the laser beam of the bar-code reader or the laser beam must be positioned directly over the bar-code. This positioning must be accomplished in such a way as to allow the laser beam to move perpendicularly across the parallel widths of the bars. If these requirements are not met, the bar-code reader will fail to correctly identify the bar-code. Thus, one must ensure that the bar-codes meet the size and shape requirements, and that the bar-code reader is used correctly. Since one cannot completely eliminate human error, for example, it is difficult to achieve perfect reliability for reading and identifying bar-codes in the above-described conventional system.

Another conventional bar-code system utilizes a camera for reading the bar-code, instead of a laser, and is typically found within a manufacturing environment. For example, bar-codes are placed on components so that a camera may identify each component as the components moves through the assembly line. That is, a camera may be placed at a specified location such that a bar-code of a component moves directly below the camera. The camera translates the bar-code into a representational image, and the image is then analyzed and interpreted. The camera is typically configured and positioned so that the bar-code fills the view of the camera and the camera takes a high-resolution bar-code image which is then analyzed and identified.

Like the conventional laser-based bar-code system, the conventional camera-based bar-code system has many disadvantages. For example, in order to achieve accurate results, the camera must have a high dynamic range, the lighting must be consistently bright, or the resolution of the bar-code image must be relatively high. Otherwise, the bar-code image may be incorrectly interpreted. For example, under low lighting conditions, the bars of the bar-code image may appear wider than they actually are. By way of another example, if the resolution is too low, the bar-code image may appear blurry. That is, one dark area of the bar-code is mapped onto too few pixels, and the bar-code image is analyzed incorrectly. In sum, the reliability of the camera-based bar-code system is dependent on lighting conditions, resolution parameters, and camera specifications.

As a result of the built-in constraints of the above-described conventional bar-codes recognition systems, the above-described systems only work in a tightly constrained environment. For example, conventional bar-code systems may not work well in the context of a system where the bar-code was positioned within a small area of the image. By way of another example, the reliability of conventional bar-code systems may be significantly reduced under poor or nonuniform lighting conditions.

Thus, there is a need for an improved coded object system and a method for recognizing codes within the coded object system even when lighting conditions, resolution parameters, and camera capabilities are not ideal. That is, what is needed is a method and apparatus for recognizing codes within a less constrained environment. Additionally, there is a need for a code recognition system that could be implemented in real time and run on a relatively low-end processor.

SUMMARY OF THE INVENTION

To achieve the foregoing and other objects and according to the purpose of the present invention, a method of tracking coded objects that are located within a physical system and are represented within an image is disclosed. The method includes the act of receiving a first image having a plurality of image pixels that include a first pixel, a first neighbor pixel, and a plurality of coded objects pixels that include the first pixel, wherein the coded object pixels represent a first coded object of the physical system that has a known code pattern and the act of obtaining object data about the first coded object by comparing luminosity values of the first pixel and the first neighbor pixel.

In a preferred embodiment, the object data specifies a pixel of the plurality of pixels as being a reference pixel within the first coded object that has the known code pattern. The act of obtaining the object data further includes the acts of comparing luminosity values of the first pixel and a first group of neighbor pixels of the plurality of pixels, determining a first count of the first group neighbor pixels that have a luminosity value that is lower than a first pixel luminosity value of the first pixel, determining whether the first count is more than a predetermined number, and defining the first pixel as the reference pixel of the first code object when the first count is higher than the second count.

In an alternative embodiment, the object data specifies a pixel of the plurality of pixels as being a reference pixel within the first coded object that has the known code pattern. The act of obtaining object data include the acts of comparing luminosity values of the first pixel and a first group of neighbor pixels of the plurality of pixels, determining a first count of the first group neighbor pixels that have a luminosity value that is lower than a first pixel luminosity value of the first pixel, comparing luminosity values of a second pixel and a second group of neighbor pixels of the plurality of pixels determining a second count of the second group neighbor pixels that have a luminosity value that is lower than a second pixel luminosity value of the second pixel, and determining whether the second count is more than a predetermined number. The act of obtaining object data further includes the act of defining the first pixel as the reference pixel of the first code object when the first count is higher than the second count and the act of defining the second pixel as the reference pixel of the first code object when the second count is higher than the first count.

In another embodiment, the object data indicates a position of the first pixel. The act of obtaining the object data further includes the act of comparing luminosity values of a first region of pixels of the plurality of pixels to determine a minimum value position of a selected pixel of the first region that has a minimum luminosity value that is lower than any other pixel of the first region, wherein the region includes the first pixel, the first pixel having a black color and the other pixels of the region having a white color. The act of obtaining the object data further includes the act of defining the position of the first pixel as being at the minimum value position within the first region.

In a preferred embodiment, the act of obtaining the object data further indicates a position of a second pixel, wherein the first pixel being black and the second pixel being white. The act of obtaining the object data further includes the act of subtracting the luminosity value of each pixel of the plurality of pixels that is positioned within a defined white region from an associated pixel of the plurality of pixels that is positioned in a defined black region. The pixels of the defined white region are mostly white except for the first pixel, and the pixels of the defined black region are mostly black accept for the second pixel. The act of obtaining the object data further includes the acts of determining a minimum subtraction position for the pixels that result in a lowest subtraction result and defining the position of the first pixel and the second pixel as being at the minimum subtraction position within the white region and the black region.

In an alternative embodiment, the object data indicates whether the first pixel is black or white, and the first neighbor pixel is a known white pixel. The act of obtaining the object data includes the acts of determining whether a first pixel luminosity value of the first pixel is smaller than a first neighbor luminosity value of the first neighbor pixel by more than a predetermined value, defining the first pixel as black when the first pixel luminosity value of the first pixel is smaller than the first neighbor luminosity value of the first neighbor pixel by more than a predetermined value, and defining the first pixel as white when the first pixel luminosity value of the first pixel is not smaller than the first neighbor luminosity value of the first neighbor pixel by more than a predetermined value.

In an alternative embodiment, the object data also indicates whether the first pixel is black or white, and the first neighbor pixel is a known white pixel. The act of obtaining the object data further includes the acts of comparing luminosity values of the first pixel and a second neighbor pixel of the plurality of pixels, wherein the first neighbor pixel and the second neighbor pixel are known white pixels, and determining whether a first pixel luminosity value of the first pixel is smaller than a maximum value luminosity of the first neighbor pixel and the second neighbor pixel by more than a predetermined value.

In an alternative embodiment, the object data also indicates whether the first pixel is black or white, and the first neighbor pixel is a known white pixel. The act of obtaining the object data further includes of the acts of comparing luminosity values of the first pixel and a second neighbor pixel, wherein the first neighbor pixel is a known white pixel and the second neighbor pixel is a known black pixel, determining whether the first pixel luminosity value of the first pixel is smaller than the first neighbor luminosity value of the first neighbor pixel by more than a second neighbor luminosity value of the second neighbor pixel is smaller than the first pixel luminosity value of the first pixel, defining the first pixel as black when the first pixel luminosity value of the first pixel is smaller than the first neighbor luminosity value of the first neighbor pixel by more than the second neighbor luminosity value of the second neighbor pixel is smaller than the first pixel luminosity value of the first pixel, and defining the first pixel as white when the first pixel luminosity value of the first pixel is not smaller than the first neighbor luminosity value of the first neighbor pixel by more than the second neighbor luminosity value of the second neighbor pixel is smaller than the first pixel luminosity value of the first pixel.

In an alternative embodiment, the object data also indicates whether the first pixel is black or white, and the first neighbor pixel is a known white pixel. The first neighbor pixel has a color that is opposite a color of the first pixel, and the act of obtaining the object data further includes the acts of determining whether a first neighbor luminosity value of the first neighbor pixel is greater than a first pixel luminosity value of the first pixel, defining the first pixel as black when the first neighbor luminosity value of the first neighbor pixel is greater than the first pixel luminosity value of the first pixel, and defining the first pixel as white when the first neighbor luminosity value of the first neighbor pixel is not greater than the first pixel luminosity value of the first pixel.

In another embodiment of the present invention, a coded object that is configured to be scanned by a camera and included in an image that is received as input to a computer implemented coded object recognition program is disclosed. The coded object includes a first region that is represented as a first region image in the received image and a second region that is represented as a second region image in the received image. The first region has an opposite color of the second region such that the coded object may be matched to a known coded pattern by determining whether a certain percentage of pixels within the second region image have a higher luminosity value than the first region image.

DETAILED DESCRIPTION OF THE PREFERRED EMBODIMENTS

Figure 1:
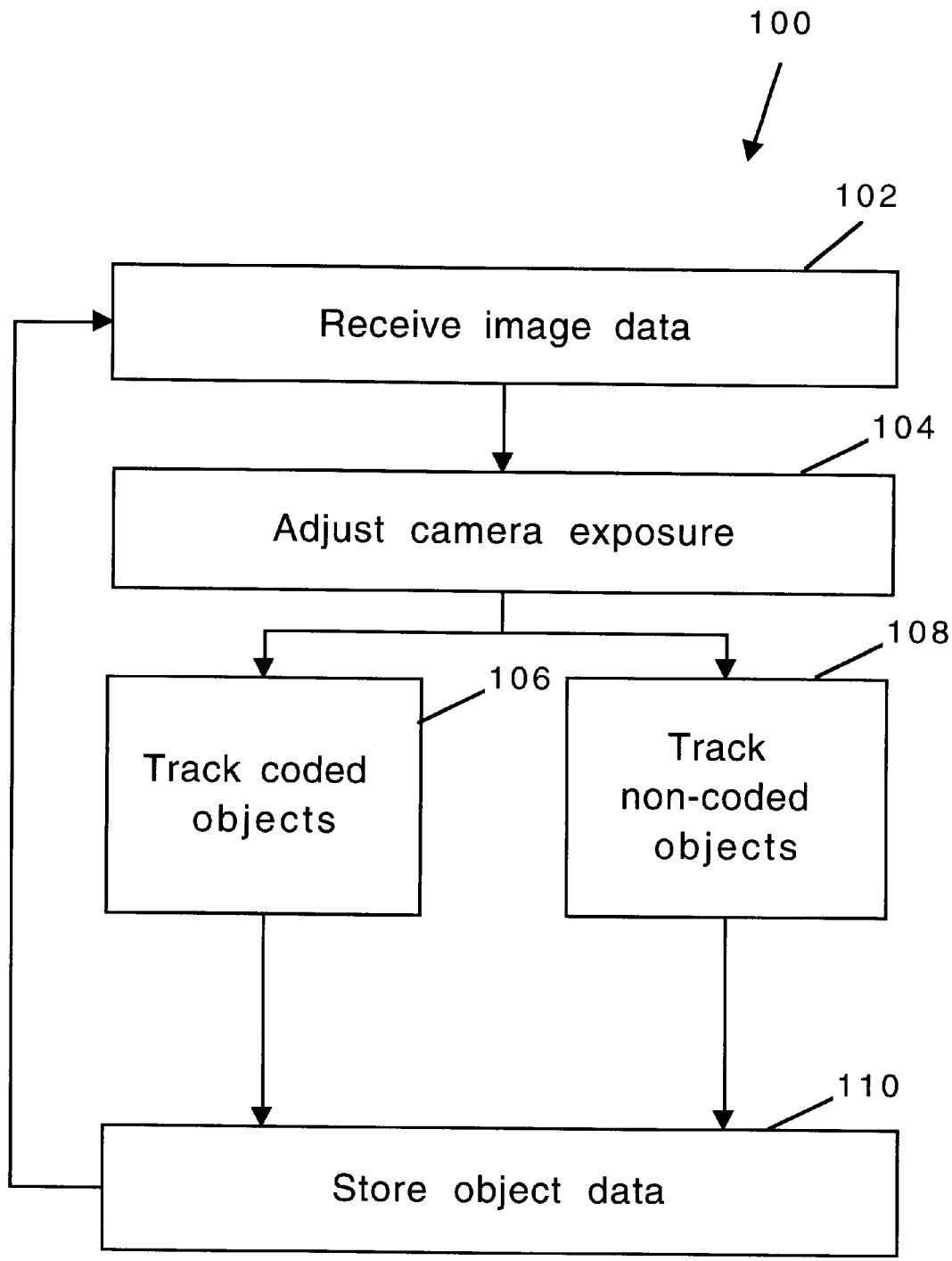
FIG. 1 is a flowchart illustrating a process of recognizing objects within a physical system in accordance with one embodiment of the present invention.

While this invention has been described in terms of several embodiments and specific examples, there are alterations, permutations, and equivalents which fall within the scope of this invention. It is therefore intended that the following appended claims be interpreted as including all such alterations, permutations, and equivalents as fall within the true spirit and scope of the present invention.

In general terms, the current invention includes a method and apparatus for analyzing an image having a plurality of coded physical objects, and recognizing and analyzing the coded physical objects under variable conditions. The present invention may be implemented for tracking coded objects that have fixed locations, as well as tracking coded objects that have variable locations. (The term "tracking" includes the acts of recognizing, interpreting, and/or analyzing coded objects within a particular frame, as well as from frame to frame).

The present invention may be implemented on any conventional hardware and computer interface system. For example, the present invention is well suited for recognizing and tracking game pieces within a physical game system, where the user may manipulate physical objects or game pieces on the game board, or toy board. The present invention is especially well suited for tracking coded objects (or game pieces) in a physical game system.

Basically, an image is received from a camera that has obtained the image of the physical system, including the coded objects. The image is analyzed using techniques, which are described below, to track the coded object. For example, the techniques of the present invention may be implemented to identify and interpret the coded objects.

Although portions of the following description are in reference to a game board, of course, it should be well understood by those skilled in the art that the application of the current invention is not limited to a game board, but may be implemented with any appropriate physical objects where recognition of coded objects is required. Although the following description is in reference to a computer system interface, it should be understood that other type of interfaces may be used, such as a television game system or set top box.

The present invention may be implemented with a video camera computer input system having an interchangeable spatial reference member with various physical objects thereon. One example of an interchangeable spatial reference member is a game board. A camera is positioned to obtain an image of the interchangeable spatial reference member (or game board) and physical objects (game pieces). Several examples of various video camera computer input systems and spatial reference members are described in U.S. patent application Ser. No. 08/675,104 filed Jul. 3, 1995 entitled, "Video Camera Based Computer Input System With Interchangeable Physical Interface" by Piernot, et al., and which is herein incorporated by reference.

A computer method may be provided for interfacing with the physical objects of the game board in a complex manner. As the user interacts with the physical objects, the user is provided with a corresponding audiovisual interaction on the computer, which interaction greatly enhances the game experience. Several examples of computer interfaces for a physical game board are described in co-pending U.S. patent application Ser. No. 09/018,023 filed concurrently herewith, which is incorporated herein by reference for all purposes.

FIG. 1 is a flowchart illustrating a process 100 of recognizing objects within a physical system in accordance with one embodiment of the present invention. Initially, in operation 102, image data is received. This image may include a representation of the entire underside of the board game, for example. That is, the image will include coded objects that are associated with particular physical objects on the game board. The image may also include non-coded objects, such as the user's hand as detected through a transparent board, for example.

After the image data is received, the camera exposure may be adjusted to obtain the best image in operation 104. Of course, the camera may not have to be adjusted if the image is already optimal or object identification reliability is at an acceptable level. In operation 106, the coded objects are tracked, which operation is further described in reference to FIG. 2 through 10. In operation 108, the non-coded objects are tracked. Of course, operation 108 is optional and is dependent on the application and whether it is necessary to track non-coded objects. Operation 108 is described in more detail below with reference to FIGS. 15 and 16.

After the non-coded objects, if any, are tracked, object data that was obtained during the tracking operations 106 and 108 is stored in operation 110. Object data includes information that may be utilized to identify, interpret, and/or recognize the objects or portions of the coded object. Next, operations 102 through 110 are repeated so that another set of image data is received, the camera is adjusted, coded and non-coded objects are tracked, a new set of object data is stored, and operations 102 through 110 are repeated for another received image.

The adjusting procedure of operation 104 may be accomplished by a conventional luminosity-based method. For example, the exposure may be adjusted such that the average luminosity of the entire image is 50%. However, this conventional exposure adjustment method is dependent on the objects of the physical system. For example, if the physical system has an unusual number of dark objects, the exposure may be incorrectly adjusted such that the image is overexposed.

Alternatively, a more preferred embodiment of the present invention includes a method for adjusting the exposure by analyzing the entropy level of the image. That is, an entropy level of the image is computed. An exposure time is then computed that will be expected to maximize the entropy of the image. In one embodiment, a PID control algorithm is used. The entropy of an image represents the amount of information contained in the image, as is well understood by those of skill in the art of information processing. Maximizing the amount of information contained in the image is one way that an optimal exposure time may be determined. Although this method works well for objects on sealed opaque surface, this method also has the disadvantage of being dependent on the objects in the physical system.

In a most preferred embodiment, the physical system includes a tag that is designed to have a predetermined luminosity. The exposure is adjusted so that the luminosity of the tag is equal to the predetermined luminosity. For example, if the tag is designed to have a middle-gray color, the exposure will be adjusted such that the tag has a 50% luminosity. This tag-based adjustment method has the advantage of being dependent only on the lighting of the system and not on the objects of the physical system.

Figure 2:
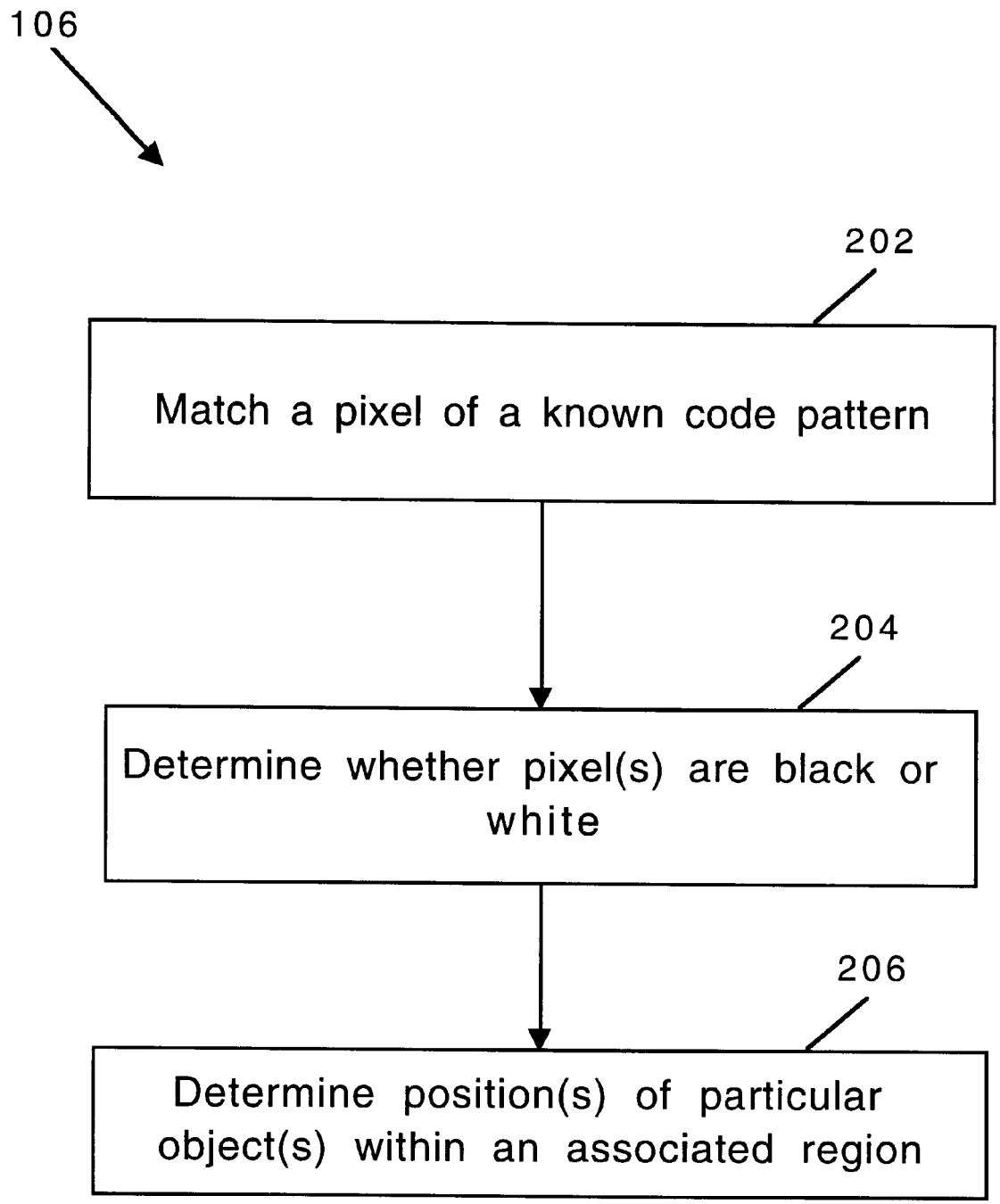
FIG. 2 is a flowchart illustrating the process of FIG. 1 of tracking the coded objects in accordance with one embodiment of the present invention.

FIG. 2 is a flowchart illustrating the process 106 of FIG. 1 of tracking the coded objects in accordance with one embodiment of the present invention. In contrast to conventional thresholding and segmentation techniques that are used for tracking non-coded objects, the process 106 of tracking coded objects works with the gray-image.

Tracking coded objects is accomplished by comparing pixel luminosity values within the image. The results of the comparison are analyzed in various ways and are used to recognize and interpret the coded objects by matching a pixel to a reference pixel of a known code pattern (operation 202), discriminating pixels (operation 204), and/or determining positions of particular objects relative to a known region (operation 206).

Of course, it may not be necessary to perform all four operations in order to track a coded object. The inclusion or exclusion of operations 202 through 206 depends on the design of the coded object and requirements of the application in which the coded object is being used. Operation 202 through 206 may be executed in any order that is suitable for tracking a particular coded object.

Additionally, each operation that is used for tracking coded objects has several alternative embodiments (which are described below in reference to FIGS. 3 through 10), where the embodiment choice depends on the particular design of the coded object and application being used. Several alternative embodiments of coded objects that work well with one or more of the alternative embodiments for tracking coded objects are described below in reference to FIGS. 11 through 13. Although specific techniques have been described for tracking coded objects in reference to FIGS. 3 through 10, these techniques are merely example techniques for tracking coded objects by comparing pixel luminosity values and are not meant to limit the scope of the invention.

Turning now to the process 106 of FIG. 2 of tracking coded objects, a particular pixel is matched with a reference pixel in a known code pattern in operation 202. For example, it is determined which pixel matches a center pixel of the known code pattern. In operation 204, pixels are discriminated. That is, it is determined whether a particular pixel (herein after referred to as "pixel X") is a black pixel or a white pixel. In operation 206, positions of particular objects are determined within a defined region of the image. For example, a particular object may be found within a defined region by implementing the techniques of operation 206.

Figure 8:
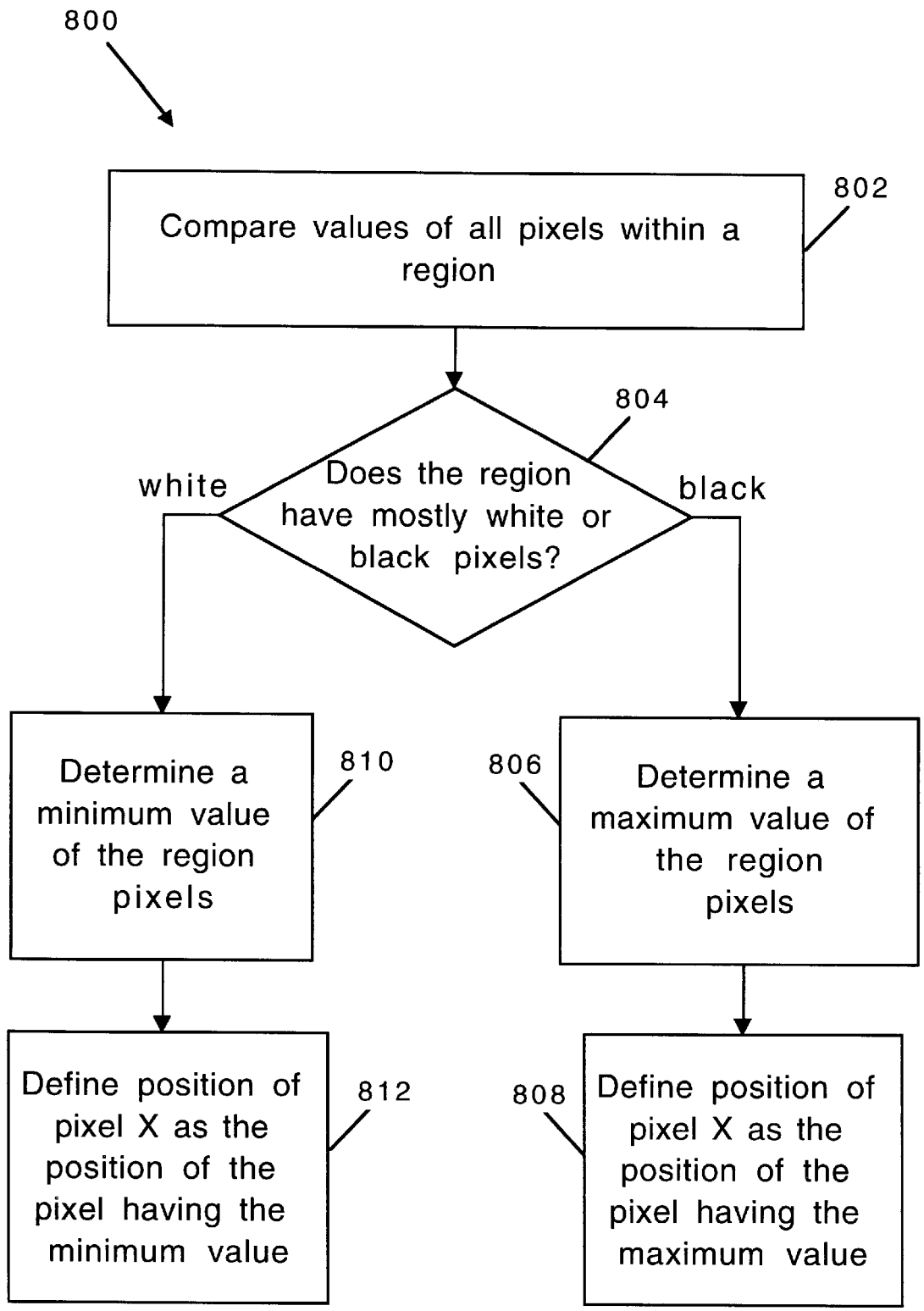
FIG. 8 is a flowchart illustrating a single-precision method of detecting the position of a particular object in accordance with one embodiment of the present invention.
Figure 9:
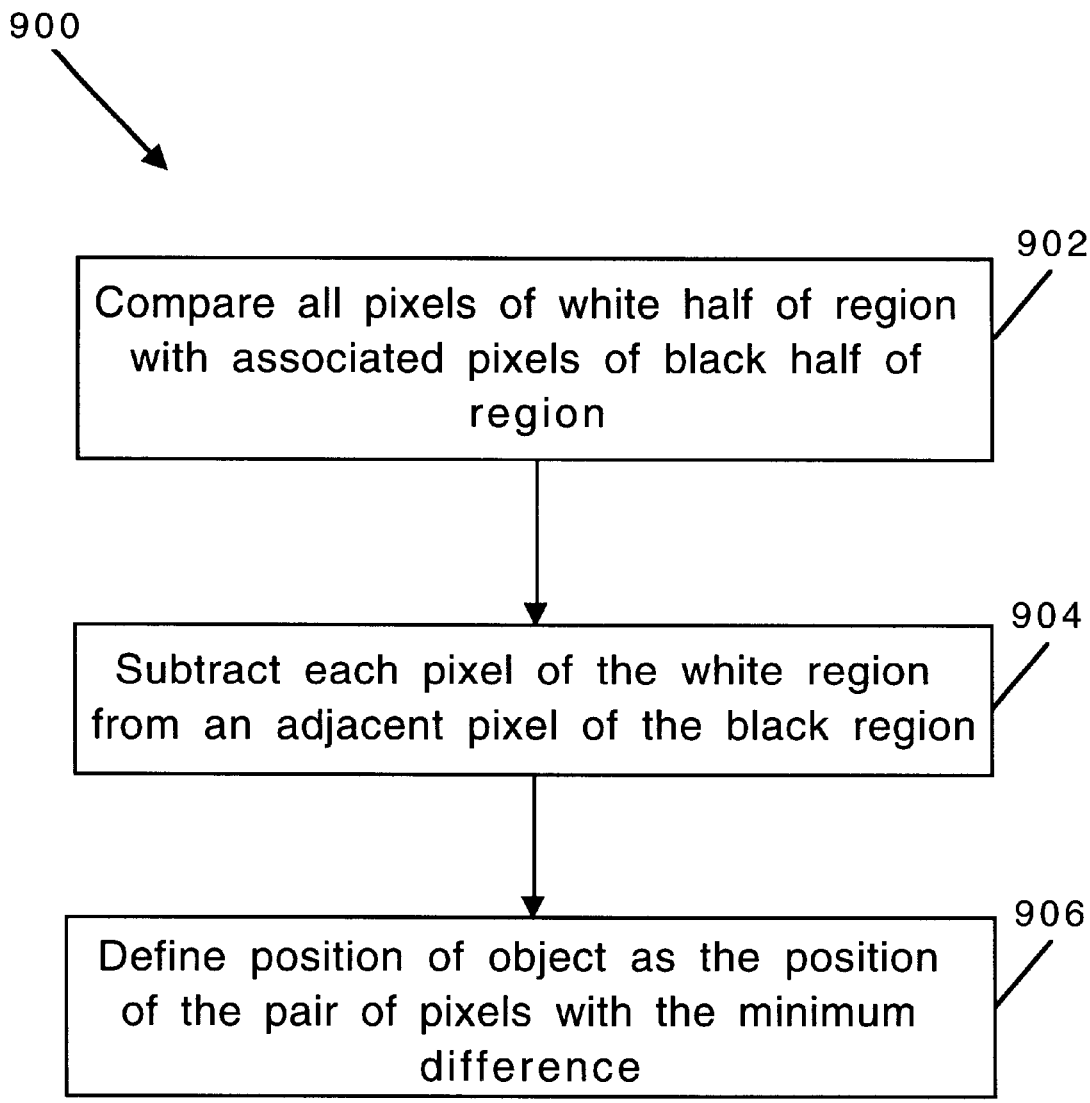
FIG. 9 is a flowchart illustrating a double-precision method of detecting the position of a particular object in accordance with one embodiment of the present invention.
Figure 10:
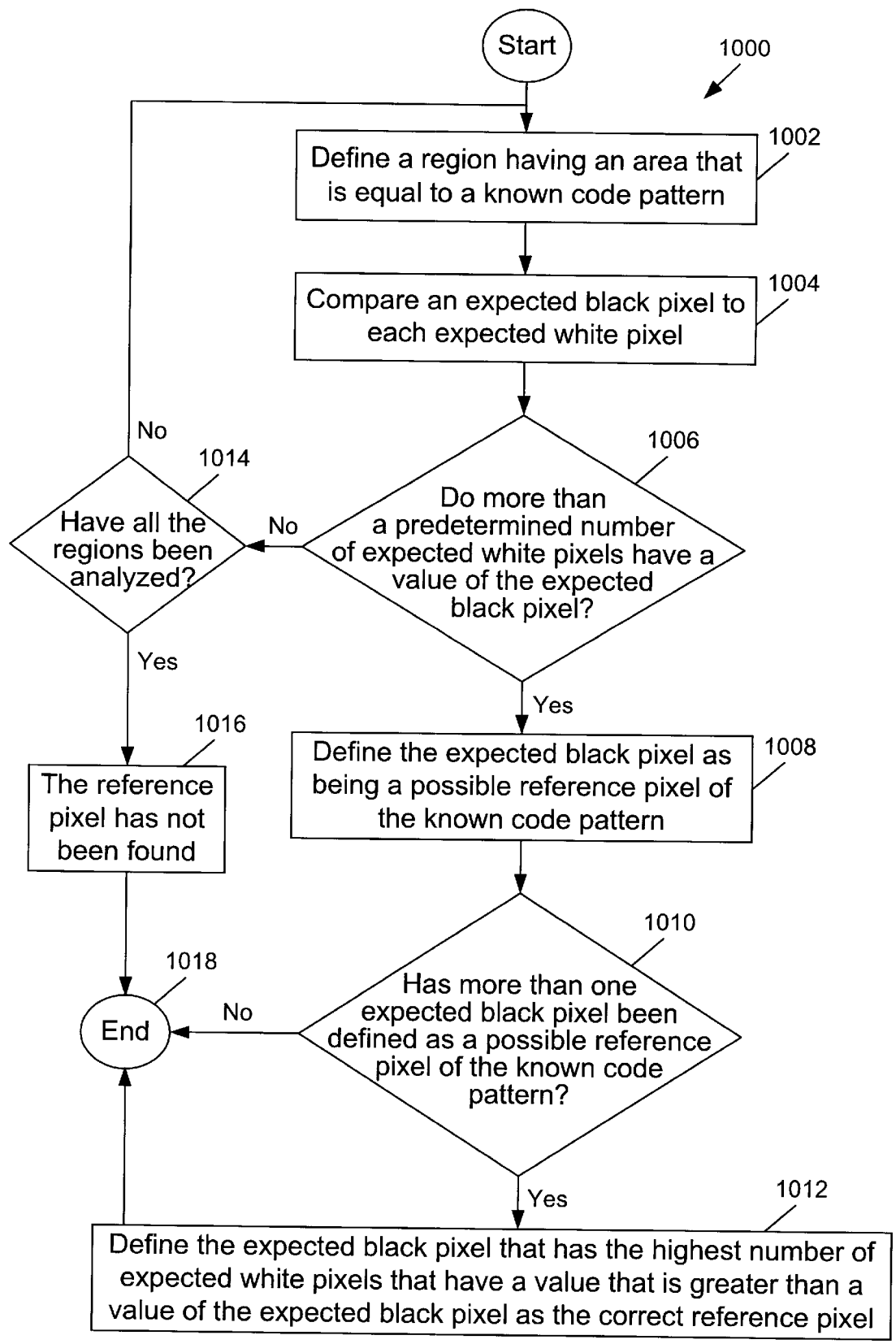
FIG. 10 is a flowchart illustrating pattern detection and selection methods in accordance with one embodiment of the present invention.

Operations 202 through 206 are described below in detail in reference to FIGS. 3 through 10. Specifically, FIGS. 3 through 7 are flowcharts illustrating methods of discriminating pixels (operation 204) in accordance with various embodiments of the present invention. FIGS. 8 and 9 are flowcharts illustrating methods of detecting the positions of objects (operation 206) in accordance with two alternative embodiments of the present invention. FIG. 10 is a flowchart illustrating a method of detecting and selecting a known code pattern (operation 202) in accordance with one embodiment of the present invention.

Figure 3:
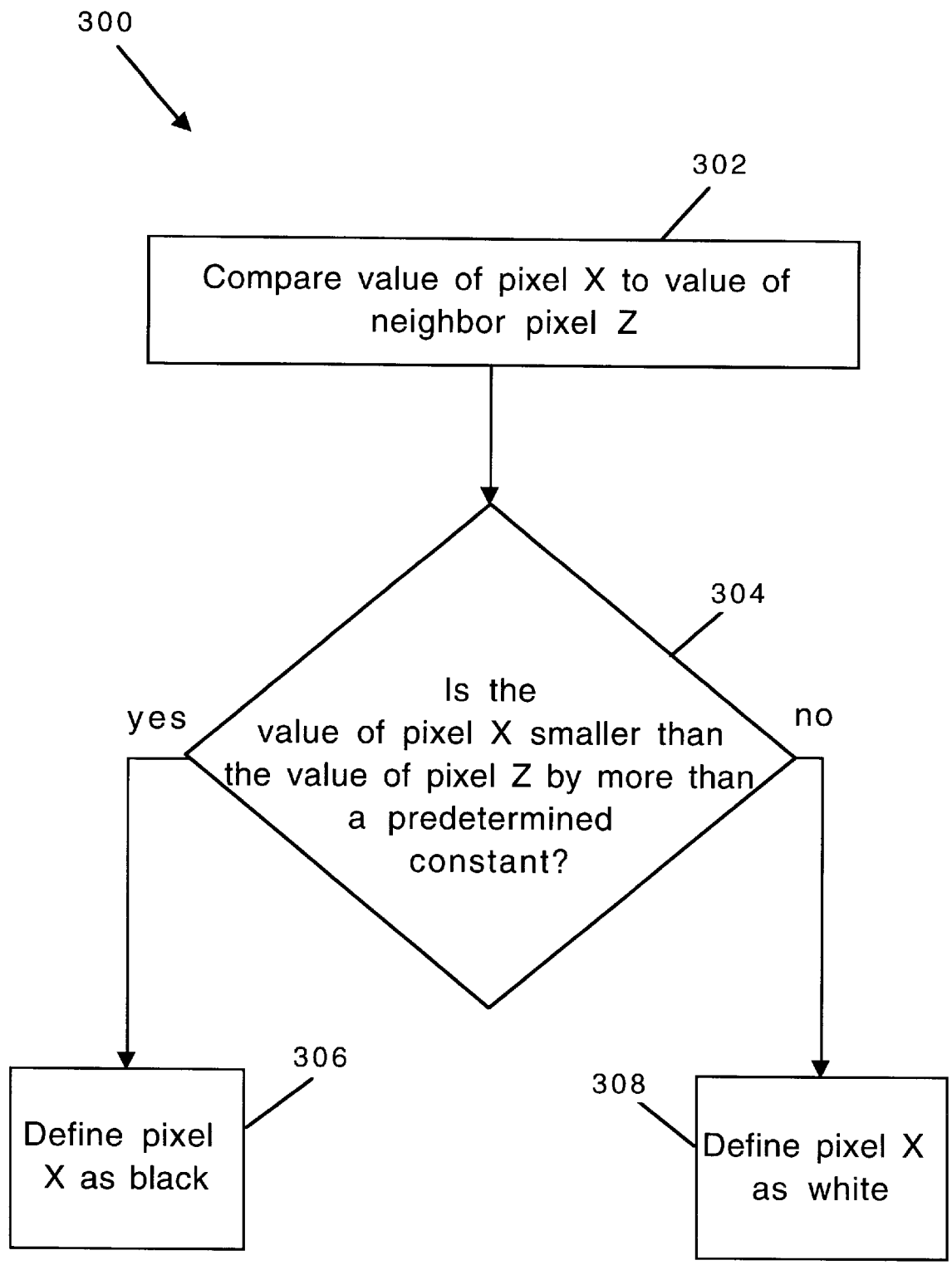
FIG. 3 is a flowchart illustrating a single-precision, single-color, single-sided method of discriminating pixels in accordance with one embodiment of the present invention.

FIG. 3 is a flowchart illustrating a single-precision, single-color, single-sided method of discriminating pixels in accordance with one embodiment of the present invention. Specifically, FIG. 3 illustrates a method of determining whether pixel X, for example, is a black pixel or a white pixel by comparing and analyzing luminosity values of pixel X and a neighbor pixel Z, which is a known white pixel The following procedure works under the assumption that if pixel X is black, its luminosity value will be lower than neighbor pixel Z's by at least a certain amount.

Initially, in operation 302 pixel X is compared to the neighbor pixel Z, which is a known white pixel. Next, in operation 304 it is determined whether the luminosity value of pixel X is smaller than the luminosity value of pixel Z by more than a predetermined constant. Preferably, the predetermined constant is greater than zero so as to increase the likelihood that a white pixel under nonuniform lighting conditions will be characterized appropriately. Most preferably, the predetermined constant is set to a medium value, such as 50% luminosity, such that the predetermined constant is greater than the maximum margin between two white pixels Z and X under nonuniform lighting conditions, for example.

Since pixel Z is a white pixel, pixel X will be substantially smaller than pixel Z if pixel X is black. (Herein after, the term "smaller" means that a luminosity value of a pixel is smaller than another pixel's luminosity value). However, if pixel X is white, pixel X will be about equal to pixel Z. Thus, in this embodiment, the color of pixel X is ascertained by comparing the values of pixel X and a white pixel Z. That is, when pixel X is smaller that pixel Z by more than the predetermined constant, pixel X is defined as a black in operation 306. When the pixel X is not smaller than pixel Z by more than a predetermined constant, pixel X is defined as white in operation 308.

This embodiment may be implemented, for example, by the following expression:

IF (pixel Z–pixel X)>k THEN pixel X=black ELSE pixel X=white ENDIF.

The constant "k" is the predetermined constant, which value is chosen such that accuracy is optimized for variable lighting conditions and corresponding variable luminosity values for a white pixel Z and X.

Although the neighbor pixel Z has been described in this embodiment as being a white pixel, it should be realized by those skilled in the art that pixel Z may be black with only slight modifications to the operations of process 106. For example, operation 304 would, for example, be modified to determine whether pixel Z is smaller than pixel X by more than a predetermined constant. Alternatively, operation 304 may be modified to determine whether pixel X is larger than pixel Z; operation 306 would be modified to define pixel X as a white pixel, for example, when pixel X was found to be larger. In sum, there are several techniques that may be used for discriminating pixel X by comparing luminosity values of pixel X and a neighbor pixel that represents an object in the physical system that has a known color.

Figure 4:
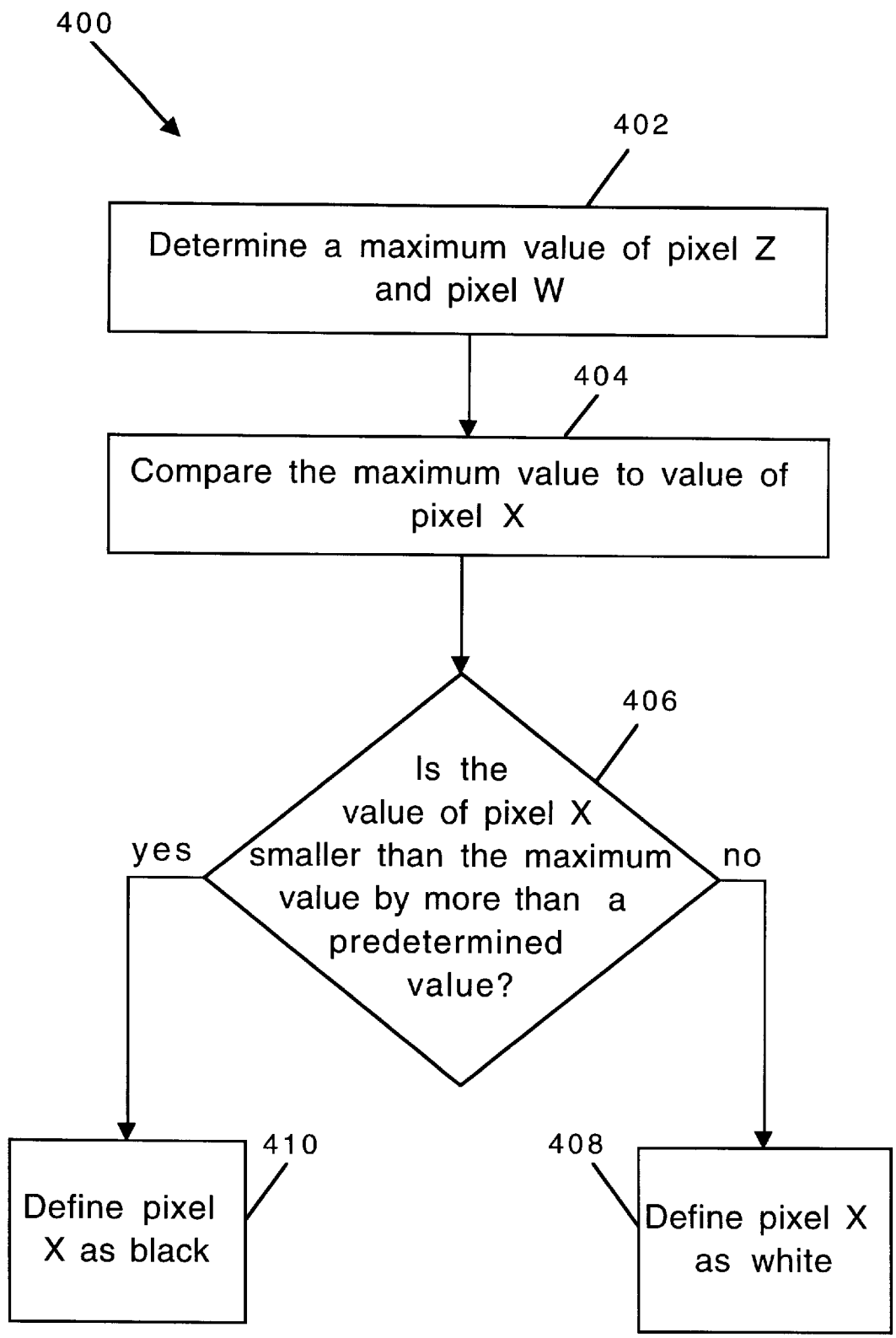
FIG. 4 is a flowchart illustrating a single-precision, single-color, double-sided method of discriminating pixels in accordance with one embodiment of the present invention.

FIG. 4 is a flowchart illustrating a single-precision, single-color, double-sided method of discriminating pixels in accordance with one embodiment of the present invention. In this embodiment, luminosity values are compared and analyzed for pixels X, Z, and W. Pixels Z and W are known white pixels. The following procedure works under the assumption that if pixel X is black, it will have a luminosity value that is lower than the brightest neighbor pixel. In other words, at least one of pixel Z or W will be significantly brighter than pixel X if pixel X is, in fact, black.

Initially, in operation 402 a maximum value of neighbor pixels Z and W is determined. In operation 404, this maximum value is compared to the value of pixel X. Preferably, pixels W and Z are on opposite sides of pixel X. This opposite placement is to increase the likelihood that one of pixels W and Z will be exposed to the same amount of light or more as pixel X. Alternatively, pixel X may be compared to white neighbor pixels that are placed on all four sides adjacent to pixel X; this "quad-sided" method would improve reliability of the discrimination process.

Next, in operation 406 it is determined whether the value of pixel X is smaller than the maximum value by more than a predetermined value. When pixel X is smaller than the maximum value, pixel X is defined as black in operation 410. When pixel X is not smaller than the maximum value by the predetermined value, pixel X is defined as white in operation 408.

Preferably, the predetermined value is greater than zero to increase the likelihood that a white pixel X will be characterized appropriately. Most preferably, the predetermined value is set to a medium value, such as 50% luminosity. The predetermined value may be greater than the predetermined constant used in the single-sided method of FIG. 3. That is, the difference between the maximum value and the value of pixel X in the double-sided method of FIG. 4 is likely to be greater than the difference between pixel X and pixel Z in the single-sided method of FIG. 3.

This embodiment may be implemented, for example, by the following expression:

IF (Max(pixel Z, pixel W)–pixel X)>k THEN pixel X=black ELSE pixel X=white ENDIF.

The function "Max(pixel Z, pixel W)" returns the maximum value of pixel Z and W. The constant "k" represents the predetermined value, which value is chosen such that accuracy is optimized for the double-sided method.

The double-sided method of FIG. 4 is more reliable than the single-sided method of FIG. 3 since two neighbors are used to determined the color of pixel X, rather than one neighbor. This double comparison decreases the likelihood that pixel X will be compared to an unusually dark white neighbor, which may result in erroneously defining a black pixel X as white. However, the double-sided method is less convenient than the single-sided method since the coded object may be larger in size to accommodate the extra neighbor pixel and an extra comparison operation is required.

Figure 5:
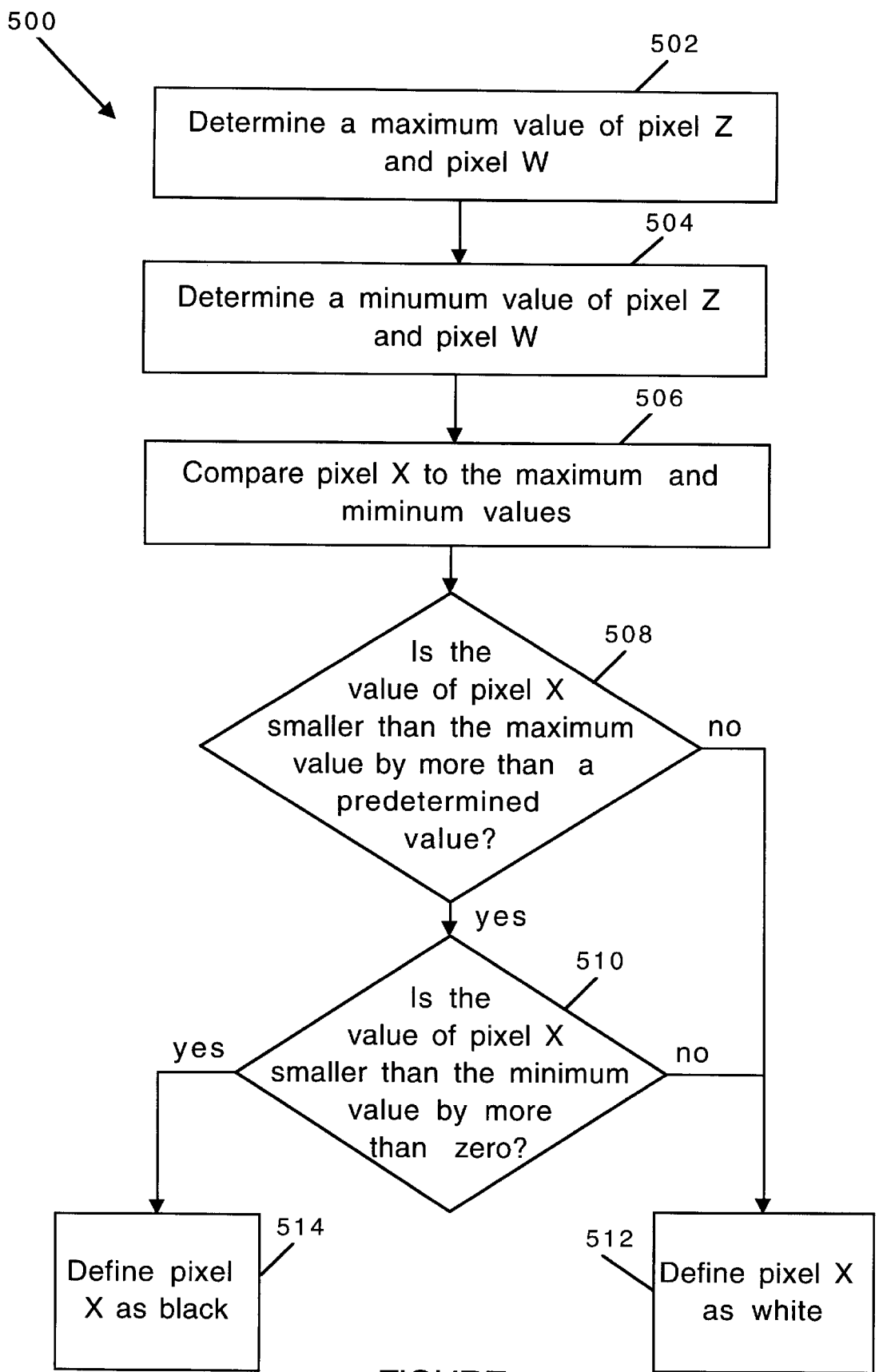
FIG. 5 is a flowchart illustrating a single-precision, single-color, combination method (combo method) of discriminating pixels in accordance with one embodiment of the present invention.

FIG. 5 is a flowchart illustrating a single-precision, single-color, combination method (combo method) of discriminating pixels in accordance with one embodiment of the present invention. This combo method combines the methods of FIG. 3 and FIG. 4, and is more accurate and thereby is preferable to the methods of FIG. 3 and FIG. 4 of discriminating pixels. In this embodiment, for pixel X to be defined as black, pixel X has to be darker than the brightest white neighbor pixel by a predetermined value and at least darker than the lesser bright neighbor.

Initially, in operation 502 a maximum value of neighbor pixel Z and neighbor pixel W is determined. In this embodiment, pixel Z and pixel W are known white pixels. Next, in operation 504 a minimum value of pixel Z and pixel W is determined. In operation 506 a value of pixel X is compared to both the maximum value and the minimum value.

In operation 508, it is determined whether the value of pixel X is smaller than the maximum value by more than a predetermined value. If the value of pixel X is not smaller than the maximum value by more than a predetermined value, pixel X is defined as white in operation 512. If the value of pixel X is smaller than the maximum value by more than a predetermined value, it is determined whether the value of pixel X is smaller than the minimum value by more than zero in operation 510. If the value of pixel X is not smaller the minimum value by more than zero, pixel X is defined as white in operation 512. If the value of pixel X is smaller than the minimum value by more than zero, pixel X is defined as black in operation 514.

This embodiment may be implemented, for example, by the following expression:

IF ((Min(pixel Z, pixel W)–pixel X)>0) & ((Max(pixel Z, pixel W))–pixel X)>k) THEN pixel X=black ELSE pixel X=white ENDIF.

The function "Min(pixel Z, pixel W)" returns the minimum value (or brightest) of pixel Z and W, and the function "Max(pixel Z, pixel W)" returns the maximum value of pixel Z and W. The constant "k" represents the predetermined value, which value is chosen such that accuracy is optimized for the combo method.

Figure 6:
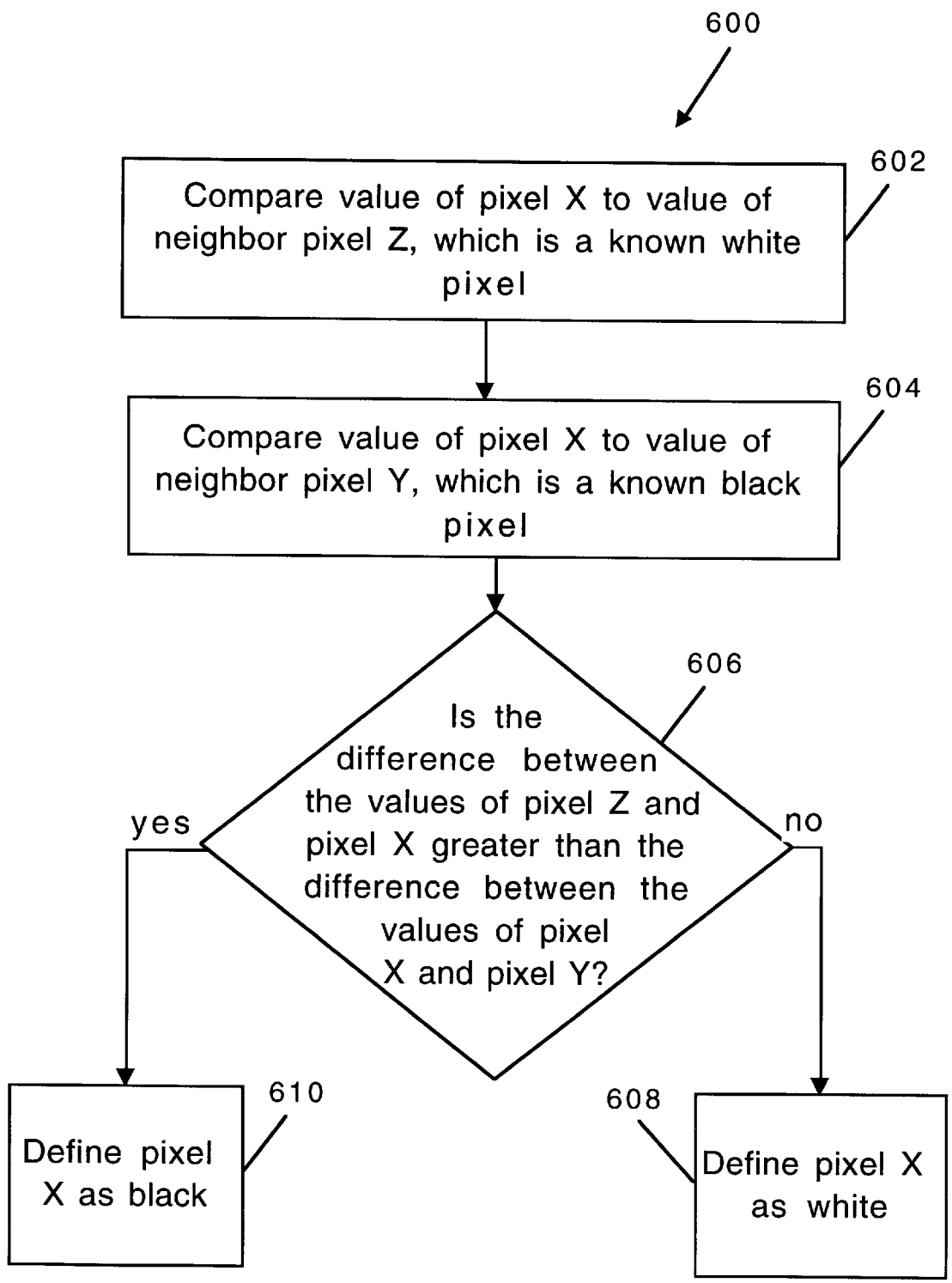
FIG. 6 is a flowchart illustrating a single-precision and double-color method of discriminating pixels in accordance with one embodiment of the present invention.

FIG. 6 is a flowchart illustrating a single-precision and double-color method of discriminating pixels in accordance with one embodiment of the present invention. In general, this method compares an unknown pixel X to a neighbor that is know to be white and a neighbor that is known to be black.

If pixel X is closer in color to the black neighbor, it is defined as a black pixel. If pixel X is closer in color to the white pixel, it is defined as a white pixel. The following techniques are one example of how the results of these comparisons may be analyzed.

Initially, in operation 602 a value of pixel X is compared to a value of neighbor pixel Z. Pixel Z is a known white neighbor pixel. In operation 604, the value of pixel X is next compared to a value of neighbor pixel Y, which pixel Y has a known black color. After pixel X is compared to both neighbors, in operation 606 it is determined whether the difference between the values of pixels Z and X is greater than the difference between the values of pixels X and Y.

If the difference between the values of pixel Z and pixel X are greater than the difference between the values of pixel X and pixel Y, pixel X is defined as black in operation 610. If the difference between the values of pixel Z and pixel X are not greater than the difference between the values of pixels X and pixel Y, pixel X is defined as white in operation 608. This embodiment may be implemented, for example, by the following expression:

```
IF (pixel Z-pixel X)>(pixel X-pixel Y) THEN pixel X=black
ELSE pixel X=white ENDIF.
```

Figure 7:
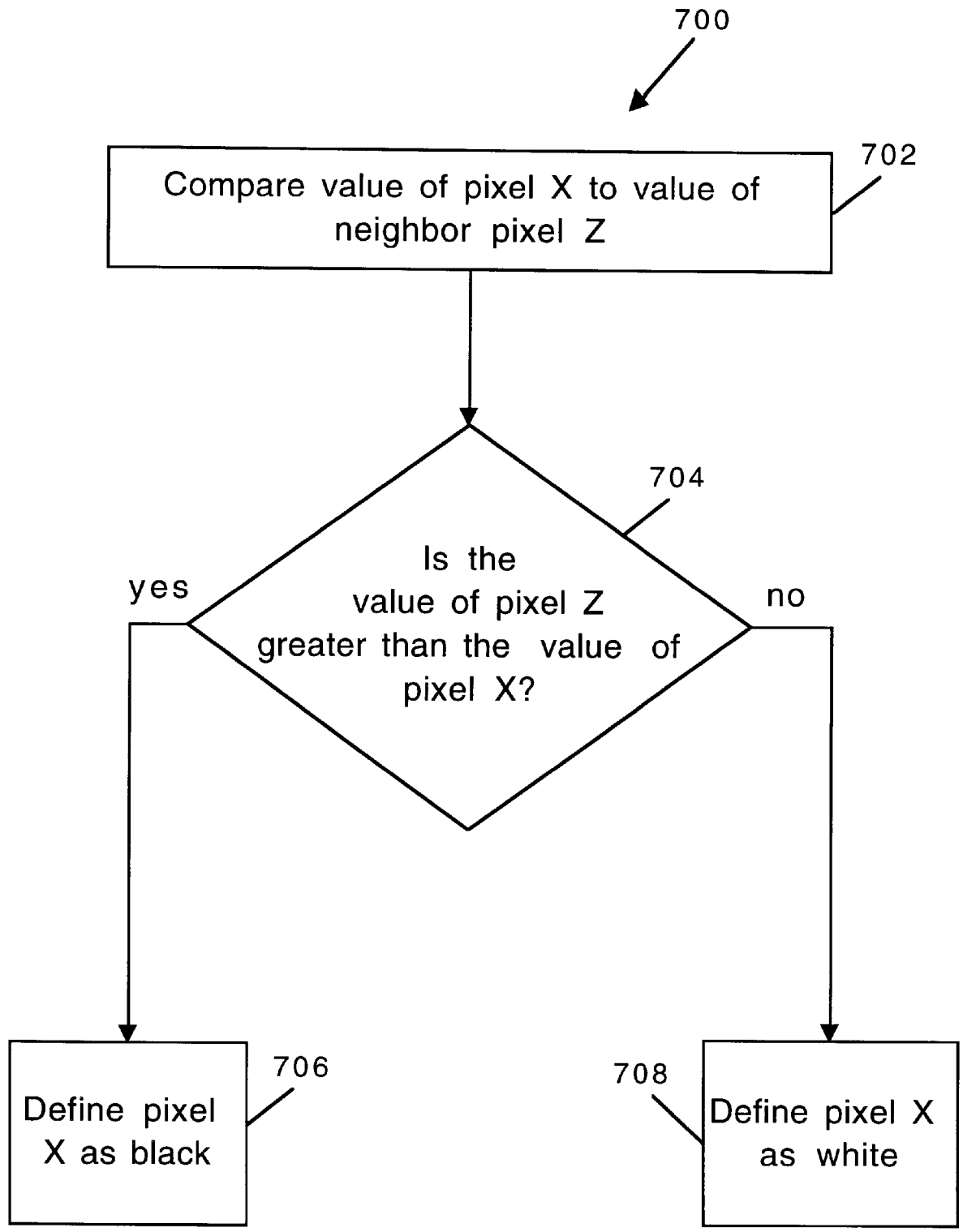
FIG. 7 is a flowchart illustrating a double-precision method of discriminating pixels in accordance with one embodiment of the present invention.

FIG. 7 is a flowchart illustrating a double-precision method of discriminating a pixel in accordance with one embodiment of the present invention. For this method, coded objects are designed such that when pixel X is black then a neighbor pixel Z is white, and when pixel X is white then pixel Z is black. Thus, to determine the color of a pair of pixels that are designed for the double-precision method, each pixel is compared to the other pixel with the lower value pixel being defined as black and the higher value pixel being defined as white. Examples of types of coded objects, which may be used with this double-precision method, are described below with references to FIG. 12, for example.

Initially, in operation 702 the value of pixel X is compared to the value of neighbor pixel Z. Pixel Z may be either black or white. Next, in operation 704 it is determined whether the value of pixel Z is greater than the value of pixel X. If pixel Z is greater than pixel X, pixel X is defined as black (pixel Z is white) in operation 706. If pixel Z is not greater than pixel X, pixel X is defined as white (pixel Z is black) in operation 708.

This embodiment may be implemented, for example, by the following expression:

```
IF (pixel Z)>(pixel X) THEN pixel X=black and pixel Z=white
ELSE pixel X=white and pixel Z=black ENDIF.
```

Alternatively this embodiment may be implemented, for example, by the following expression:

```
IF (pixel Z-pixel X)>k THEN pixel X=black and pixel Z=white
ELSEIF (pixel X-pixel Z)>k pixel X=white and pixel Z=black
ENDIF.
```

The constant "k" is a predetermined constant, which value is chosen such that accuracy is optimized for the double-precision method. For most physical systems, the constant k may be set to zero, since a white pixel usually has a higher luminosity value than a black pixel under normal lighting conditions. However, the constant k may have to be set to a value other than zero under certain poor lighting conditions.

FIG. 8 is a flowchart illustrating a single-precision method of detecting the position of a particular object of the coded object in accordance with one embodiment of the present invention. Initially, in operation 802 all pixels in a region are compared. All pixels within the region, except pixel X have a particular color, and pixel X has an opposite color from the other pixels in the region. For example, if pixel X is black, the other pixels within the region are white. This difference in colors may be utilized to determine the position of pixel X. Pixel X is associated with the particular object; thus, the position of the particular object may be determined from the position of pixel X. Although the following method is described as determining the position of pixel X, of course, the position of a group of pixels (group X) may be determined so as to determine the position of the particular object by implementing a similar method.

In operation 804, it is determined whether the region includes mostly white or black pixels. Of course, this operation 804 is not necessary when the color of the region is already known. If the region is mostly black, in operation 806 a maximum value within the region is determined, and the position of pixel X is defined in operation 808 as the position of the pixel having the maximum value. However, if the region is mostly white, in operation 810 a minimum value within the region is determined, and the position of pixel X is defined in operation 812 as the position of the pixel having the minimum value.

This embodiment may be implemented, for example, by the following expression:

```
IF (most region pixels=black) THEN position of pixel X=position
of Max(pixels within the region) ENDIF IF (most region pix-
els=white) THEN position of pixel X=position of Min(pixels
within the region) ENDIF.
```

Of course, those skilled in the art would realize that other expressions may be utilized for the single-precision positioning method.

FIG. 9 is a flowchart illustrating a double-precision method of detecting the position of a particular object of the coded object in accordance with one embodiment of the present invention. For example, the particular object may be movable within a region that includes a white neighbor pixel and a black neighbor pixel, the white neighbor pixel changes to a black pixel as the particular object moves over the white neighbor pixel. Likewise, the black neighbor pixel changes to white. Examples of this type of coded object, which may be used with this double-precision method, are described below with references to FIG. 14, for example.

Initially, in operation 902 all pixels of a first half of a region are compared with associated pixels of a second half of the region. In this example, the first half pixels are mostly black (pixels Z), and the second half pixels are mostly white (pixels Y). Next, in operation 904 a difference between each pair of pixels Z and Y is determined. In operation 906, a position of the particular object is defined as the pair of pixels Z and Y that has the minimum difference.

This embodiment may be implemented, for example, by the following expression:

```
IF ((pixels Z=black) & (pixels Y=white) THEN position of pixel
X=Min(pixel Z-pixel Y) ENDIF.
```

Of course, those skilled in the art would realize that other expressions may be utilized for the double-precision positioning method.

FIG. 10 is a flowchart illustrating pattern detection and selection methods in accordance with one embodiment of the present invention. These methods are used to identify a particular pixel as being a possible reference pixel of a known code pattern. Additionally, these methods are used for determining which of the possible pixels (if more than one) more closely matches the reference pixel of the known code pattern.

Initially, in operation 1002 a region having an area that is equal to a known bar code pattern area is defined. Next, in operation 1004 an expected black pixel is compared to each expected white pixel. In operation 1006, it is determined whether more than a predetermined number of expected white pixels have a value that is greater than a value of the expected black pixel. If the number is higher than the predetermined number, in operation 1008 the expected black pixel is defined as being a possible reference pixel of the known code pattern.

After the expected black pixel is defined as a possible reference pixel of the known code pattern, in operation 1010 it is determined whether more than one expected black pixel has been defined as a possible reference pixel of the known code pattern. If more than one possible reference pixel has been defined, in operation 1012 the expected black pixel that has the highest number of expected white pixels that have a value that is greater than a value of the expected black pixel is defined as the correct reference pixel of the known code pattern. The process ends in operation 1018.

An alternative technique may include determining whether a sum of each luminosity value of each expected white pixel minus the luminosity value of the expected white pixel is greater than a predetermined value. Additionally, this embodiment may be utilized with minor changes to determine which white pixel is equivalent to the reference pixel. In this example, an expected white pixel is compared to a group of expected black pixels.

If it is determined in operation 1006 that a predetermined number of expected white pixels do not have a value that is greater than a value of the expected black pixel, the process proceeds to operation 1014 and another region is analyzed. In operation 1014, it is determined whether all the regions have been analyzed. If all the regions have not been analyzed, the process proceeds to operation 1002. If all the regions have been analyzed, it is determined that the reference pixel has not been found within the image in operation 1016. Consequently, the process ends in operation 1018.

The above described tracking methods may be implemented on various types of coded objects. For example, a coded object may include a reference object that is configured to take advantage of a double-precision pattern positioning method embodiment. A reference object that utilizes a double-precision detection embodiment will be recognized more accurately than a reference object that utilizes a single-precision positioning embodiment. The following coded objects include several features that are designed to utilize various tracking embodiments.

Additionally, the above-described tracking embodiments may be implemented to track coded objects that have a fixed position, as well as objects that are movable within the physical system or within a fixed region of the physical system. Several embodiments of fixed coded objects and movable coded objects are described in co-pending U.S. Patent application Ser. No. 09/018,023 filed concurrently herewith, which is incorporated herein by reference for all purposes.

Figure 11:
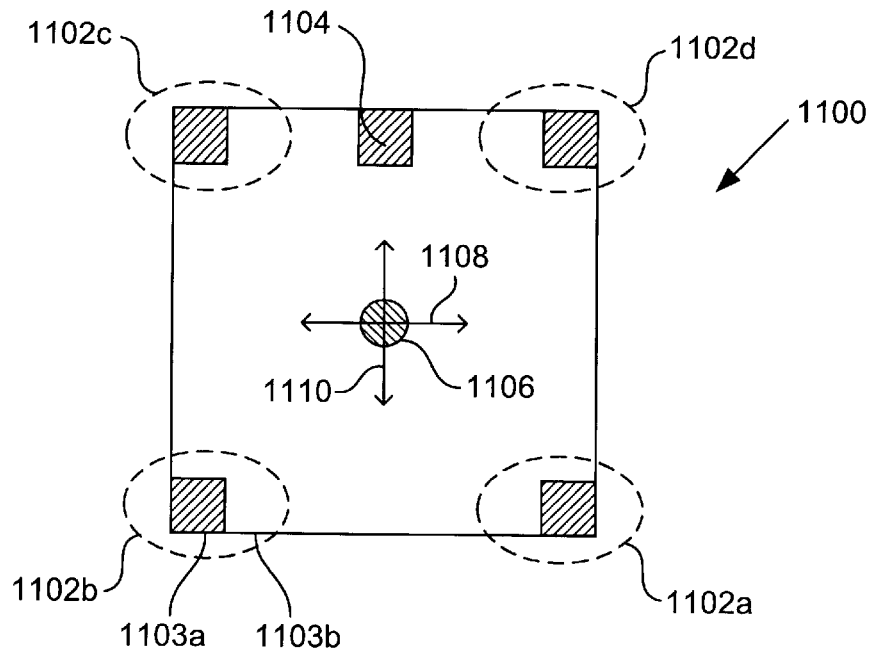
FIG. 11 is a coded object in accordance with one embodiment of the present invention.

FIG. 11 is a coded object 1100 in accordance with one embodiment of the present invention. The coded object 1100 includes a plurality of bits 1102, a reference pixel 1104, and a center pixel 1106. The center pixel 1106 may be used to detect whether the coded object 1100 is present. The bits 1102 may be used to identify the coded object 1100. The reference pixel 1104, along with the center pixel 1106, may be used to detect the orientation of the coded object.

Of course, any suitable configurations may be used for the center pixel 1106, bits 1102, and reference pixel 1104, as long as the coded object may be tracked using the tracking methods of the present invention. For example, the center pixel may not be positioned within the center of the coded object 1100.

The coded object 1100 is configured such that a variation of the combo single-precision method of FIG. 5 may be implemented to detect the presence of the coded object. The pixels that are positioned along a horizontal axis 1108 are analyzed, as well as along a vertical axis 1104. For this type of coded object, a "valley" is expected in the luminosity values of the pixels along one of the axis. That is, the value of the center pixel 1106 will be at a lower value than any of the other pixels along the horizontal axis 1108. The pixels of the coded object 1100 are analyzed for both the horizontal and vertical axis to increase the reliability of this method.

The bits 1102 are designed to utilize the double-precision discrimination method of FIG. 7. That is, each bit includes a black pixel and a white pixel. For example, bit 1102*b* has a black pixel 1103*a* and a white pixel 1103*b*. The value of the bit 1102*b* may be determined by comparing pixel 1103*a* to pixel 1103*b*. The lowest value pixel is the black pixel, and the highest value pixel is the white pixel. The relative colors of each pixel 1103*a* and 1103*b* indicate the value of the bit 1102. That is, different coded objects may have different relative colors and corresponding values for these bits 1102.

Figure 12:
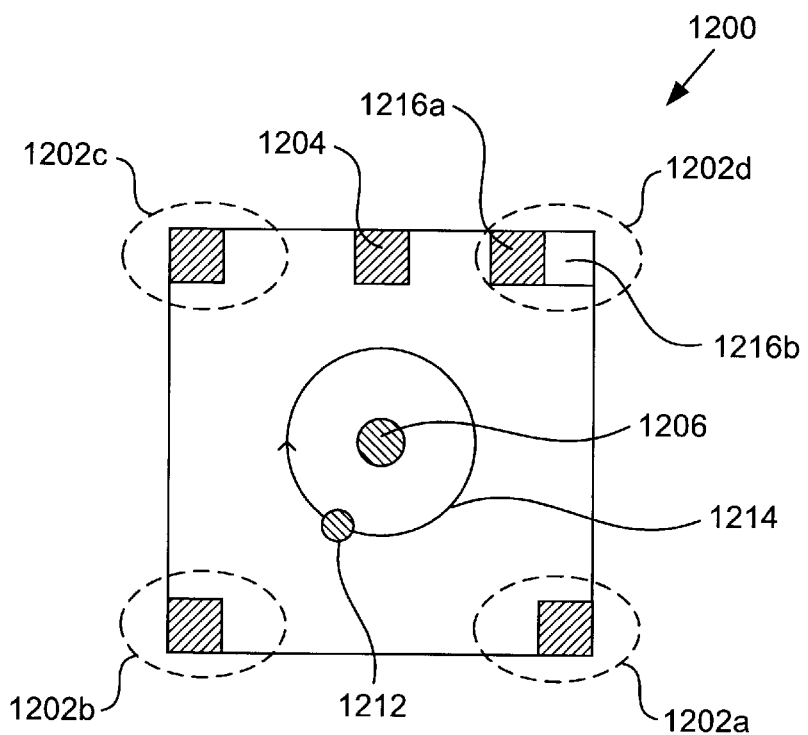
FIG. 12 is a coded object having a rotating object in accordance with an alternative embodiment of the present invention.

FIG. 12 is a coded object 1200 having a rotating object 1212 in accordance with an alternative embodiment of the present invention. In other words, the coded object has a rotating object 1212 that may be rotated by the user, for example. The position of the rotating object 1212 may be determined by implementing the single-precision method of FIG. 8 of detecting a position of a black pixel within a mostly white region. In other words, a minimum value pixel is found within a circle 1214 of mostly white pixels. The position of the rotating object 1212 is defined as the position of a minimum value pixel within the circle 1214.

The coded object 1200 also includes a code detection object 1202. As shown, the code detection mechanism includes a black object 1216*a* beside a white neighbor object 1216*b*. When the coded object is added to the system, the black object 1216*a* moves over the white neighbor object 1216*b* and another white neighbor appears to the left of the black object 1216*a* (see 1102*d* of FIG. 11). Thus, one may determine whether the coded object 1200 is present by comparing the luminosity values of the black object 1216*a* and the white object 1216*b*.

Figure 13A:
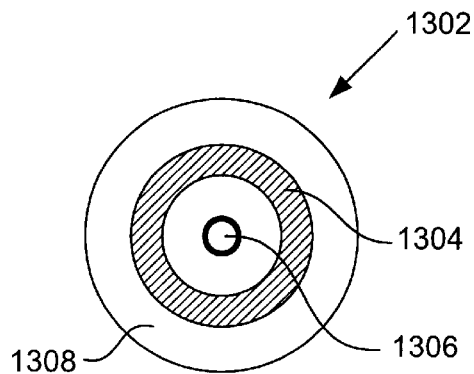
FIG. 13a is a circular coded object in accordance with an alternative embodiment of the present invention.

FIG. 13*a* is a circular coded object 1302 in accordance with an alternative embodiment of the present invention. The circular coded object 1302 has a white center 1306, a black ring 1304, and a white ring 1308. To detect this code pattern 1302, an embodiment of the pattern detection and selection methods of FIG. 10 are implemented. For example, a pixel in the center 1306 and pixels in the white ring 1308 are compared to pixels in the black ring 1304. The coded object 1302 is detected when a particular number of pixels within the black ring 1304 are darker than pixels in the white ring 1308 and white center 1306. Additionally, more than one center pixel 1306 may be compared with each of the pixels in the white ring 1308 and black ring 1304, which additionally comparison would increase the reliability of detecting the correct coded object.

Figure 13B:
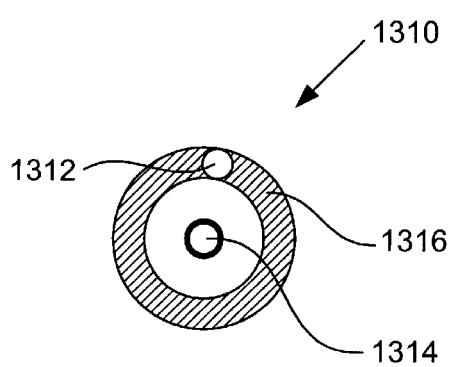
FIG. 13b is a circular coded object having a double-precision angle point in accordance with an alternative embodiment of the present invention.

FIG. 13*b* is a circular coded object 1310 having a single-precision angle point 1312 in accordance with an alternative embodiment of the present invention. The single-precision angle point 1312 may be utilized to determine the orientation of the coded object 1310, as well as bit locations and values within the coded object 1310. Examples of different types of code bits are described in reference to FIGS. 13*c* through 13*e*.

An embodiment of the single-precision position detection method is implemented to detect the position of the angle point 1312 within a region 1316. As shown, the region 1316 includes mostly black pixels. The black pixels and the angle point 1312 form a ring around the perimeter of the code 1310. The angle point 1312 is defined as the lightest pixel in the region 1316.

Figure 13C:
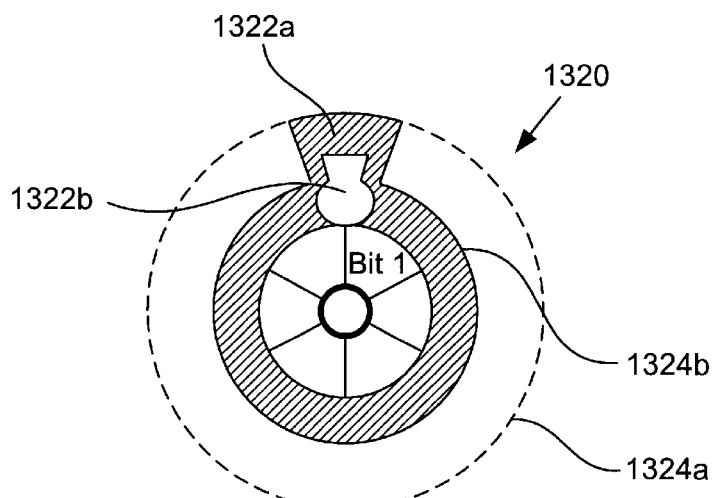
FIG. 13c is a circular coded object having a double-precision angle point in accordance with an alternative embodiment of the present invention.

FIG. 13*c* is a circular coded object 1320 having a double-precision angle point 1322 in accordance with an alternative embodiment of the present invention. The double-precision angle point 1322 includes a white pixel 1322*b* that is located within a black ring region 1324*b*, and a black pixel 1322*a* that is located in within a white ring region 1324*a*. The coded object 1320 is more robust than the coded object 1310 having the single-precision angle point. The double-precision angle point 1322 increases the likelihood that the angle point 1322 will be detected correctly.

The position of the angle point is determined by comparing the pixels in the white ring region 1324*a* to adjacent pixels in the black ring region 1324*b*. That is, a double-precision positioning method is used that is described in reference to FIG. 9. For example, a pixel in the white ring region 1324*a* is subtracted from an adjacent pixel in the black ring region 1324*b*, wherein each pair is located along a radial line that goes through a center of the coded object 1320 at a particular angle. This calculation is repeated for each pair of pixels within the white ring region 1324*a* and the black ring region 1324*b*. The position of the angle point 1322 is defined as the pair of pixels that result in a minimum subtraction value. In other words, the subtraction value for the angle point 1322 ( a black pixel minus a white pixel) will be less than for all other pixel pairs within the ring regions (a white pixel minus a black pixel).

Figure 13D:
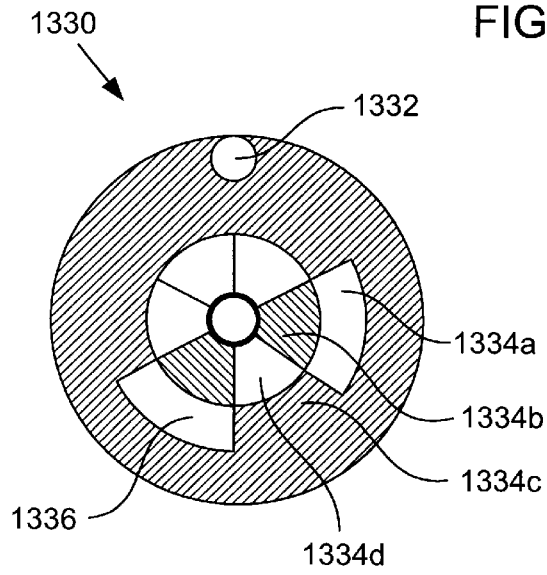
FIG. 13d is a circular coded object having a single-precision angle point and double-precision bits in accordance with an alternative embodiment of the present invention.

FIG. 13*d* is a circular coded object 1330 having a single-precision angle point 1332 and double-precision bits 1334 in accordance with an alternative embodiment of the present invention. Each of the double-precision bits 1334 include a white region and a black region. For example, a first bit is in the form of a white region 1334*a* and a black region 1334*b*. The bits are used to identify the coded object type, for example, with each particular coded object type having a different bit value arrangement.

The value of each bit is determined by reading the value of each subregion within the bit (e.g., 1334*a* and 1334*b*). The double-precision discrimination method may be used to determine the value of each bit. In other words, each bit includes a white pixel that is adjacent to a black pixel, the color of each pixel may be ascertained by comparing luminosity values of pixels 1334*a* and 1334*b*.

Figure 13E:
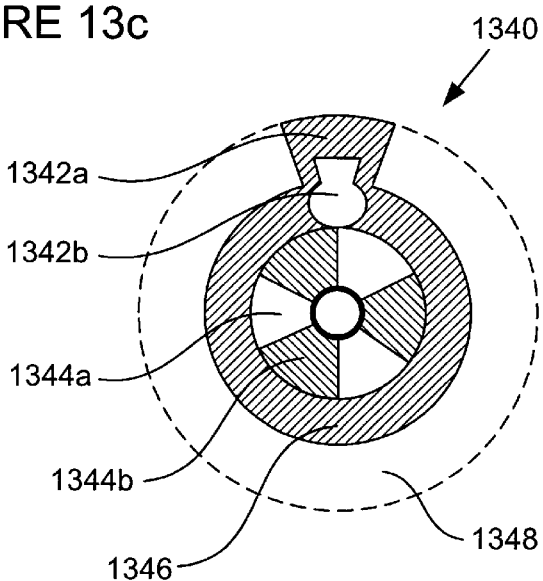
FIG. 13e is a circular coded object having a double-precision angle point and single-precision bits in accordance with an alternative embodiment of the present invention.

FIG. 13*e* is a circular coded object 1340 having a double-precision angle point 1342 and single-precision bits 1344 in accordance with an alternative embodiment of the present invention. This embodiment may result in a smaller code pattern size than the coded object 1330 having the double-precision bits since the single-precision bits of coded object 1340 requires one less ring region.

In this embodiment, one of the single-precision discrimination methods may be utilized for determining the value of each bit 1344 of code pattern 1340. For example, the color of each bit 1344 may be determined by utilizing the single-precision, double-color discrimination method of FIG. 6. Each bit is compared to a white neighbor pixel and a black neighbor pixel.

The angle point 1342 may be utilized as white and black neighbor pixels, for example. First, the position of the angle point 1342 is determined by utilizing the double-precision positioning method of FIG. 9, for example. That is, the lightest pixel 1342*b* within a black ring region 1346 is defined as the white neighbor pixel, and the darkest pixel within the a white ring region 1348 is defined as the black neighbor pixel. After the neighbor pixels are determined, each bit is compared to both the white pixel 1342*b* and the black pixel 1342*a* in a double-color discrimination method of FIG. 6 to determine the value of each bit.

Figure 14:
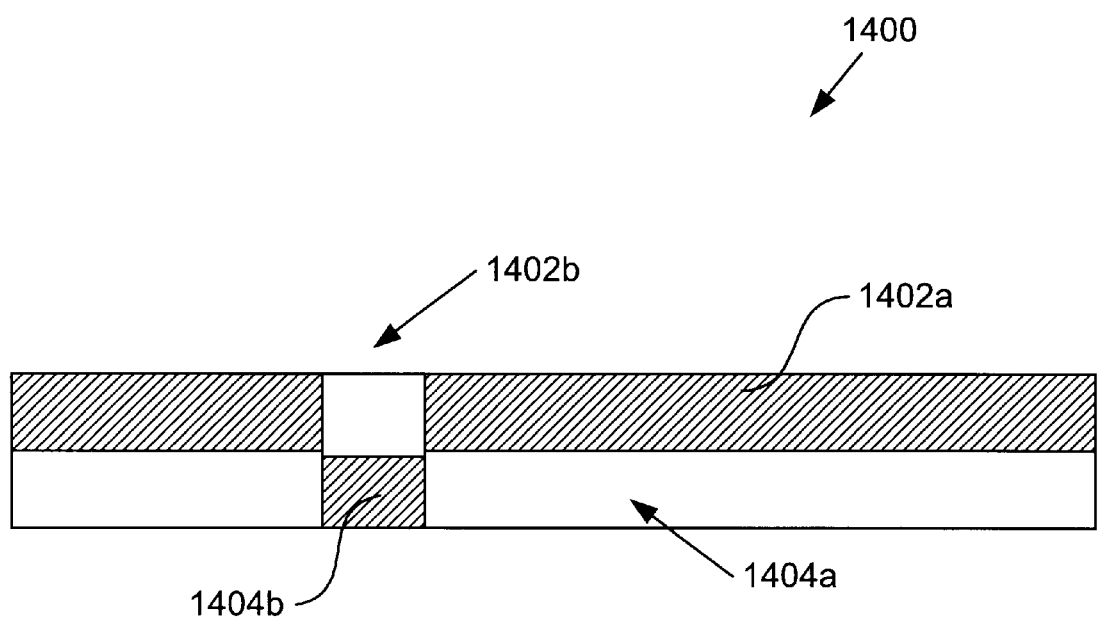
FIG. 14 is a coded object having a double-precision movable object in accordance with an alternative embodiment of the present invention.

FIG. 14 is a coded object 1400 that includes a double-precision movable object that includes a white pixel 1402*b* and a black pixel 1402*a* in accordance with an alternative embodiment of the present invention. The coded object 1400 includes a mostly white half 1402 and a mostly black half 1404. The white pixel 1402*b* of the movable object is part of the mostly black half 1402. Likewise, the black pixel 1404*b* of the movable object is part of the mostly white half 1404.

The movable object (1402*a* and 1404*a*) is slidably movable within the halves 1402 and 1404. For example, a user may move the movable object from the left side of the halves to the right side. As the movable object passes through each half, the pixels of each half change colors. In other words, each of the movable object pixels (1402*b* and 1404*b*) has a color that is a reverse of most pixels within the associated half.

The coded object 1400 of FIG. 14 is one example of a coded object that may utilize the double-precision positioning method of FIG. 9 to determine the position of the movable object. For example, each pixel in the mostly white half 1404 is subtracted from each pixel in the mostly black half 1402. The position of the pair of pixels that result in a minimum value are defined as the position of the movable object (1402*b* and 1402*a*).

The coded object recognition system of the present invention has many advantages over conventional bar-code recognition systems. If one wanted to track and identify many coded physical objects within a physical system, such as an interactive game board, the image resolution and lighting conditions would sometimes be inadequate for conventional code recognition systems to function properly. That is, since the interactive game board is designed for home use, the lighting conditions will radically vary.

For example, the lighting conditions could result in few levels of gray, which would make it difficult to distinguish black from white and thereby to recognize whether a code is present. Additionally, conventional code systems would require an expensive camera that has a high dynamic range in order to adjust for inadequate lighting conditions, for example. Since an image of the physical system may contain many coded objects, the resolution for each coded object may be relatively low. In contrast to conventional systems, the present invention will recognize codes even, for example, with variable lighting conditions, low resolution parameters, and low dynamic range cameras.

Additionally, since the code recognition techniques of the present invention include relatively simple calculations, the present invention may be implemented on a relatively low-end, low-cost processor. That is, the techniques of the present invention minimize the number of floating point operations that are required to track coded objects. Thus, the present invention may also be implemented in real time for a game application, for example.

Figure 15:
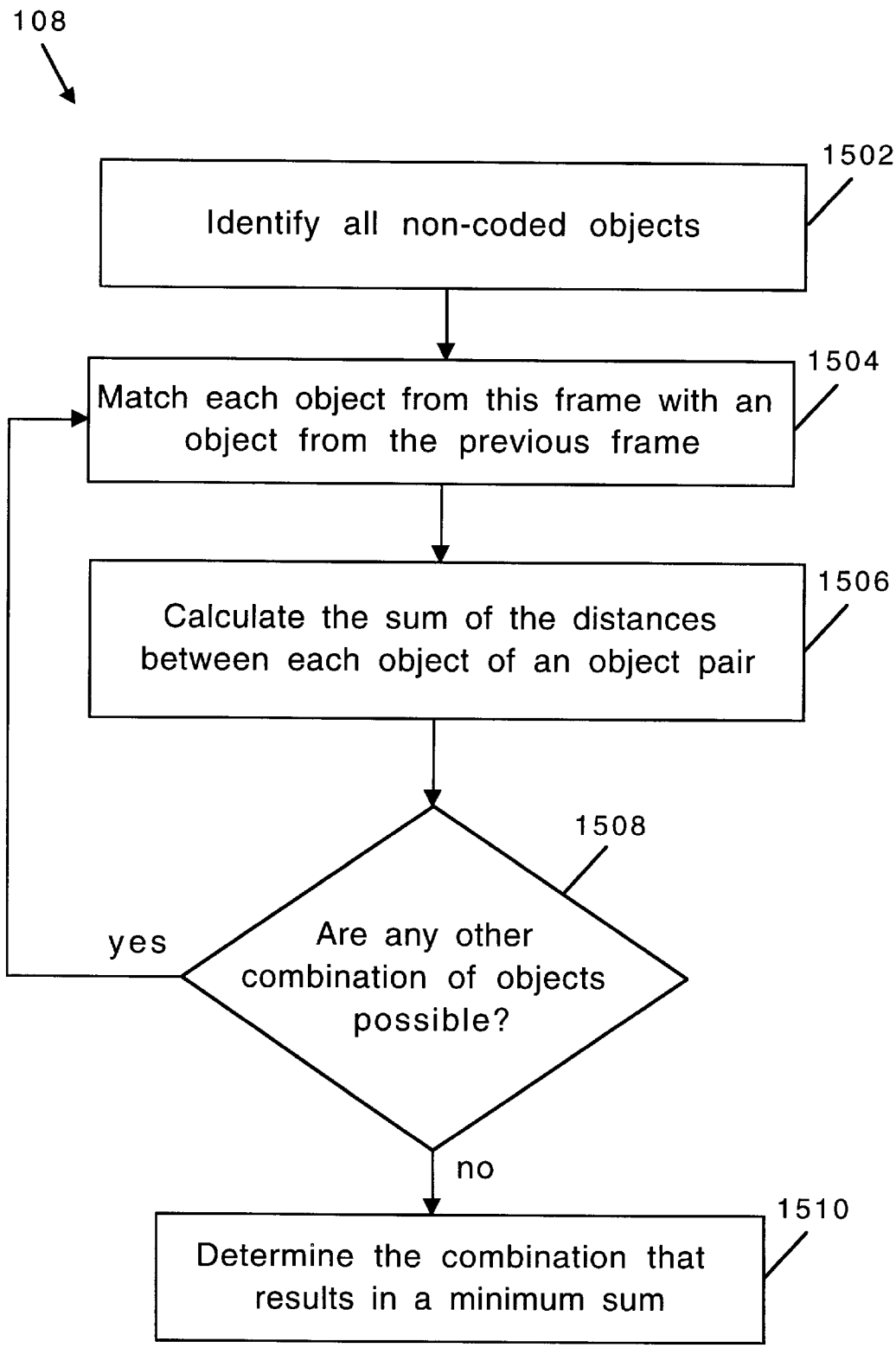
FIG. 15 is a flowchart illustrating the process of FIG. 1 of tracking the non-coded objects in accordance with one embodiment of the present invention.

FIG. 15 is a flowchart illustrating the process 108 of FIG. 1 of tracking the non-coded objects in accordance with one embodiment of the present invention. Process 108 may be eliminated if no non-coded objects are present or if it is not desirable to track non-coded objects. However, in some applications, it may be desirable to track non-coded objects, such as the user's hand.

Initially, in operation 1501, all non-coded objects are located within each image or frame. This location operation is accomplished by conventional object location techniques. A well known method for locating non-coded objects within an image is to utilize thresholding and segmentation techniques. Additional object location techniques are described in co-pending U.S. patent application Ser. No. 08/675,104 filed Jul. 3, 1995 entitled, "Video Camera Based Computer Input System With Interchangeable Physical Interface" by Piernot, et al., and which is herein incorporated by reference.

Figure 16:
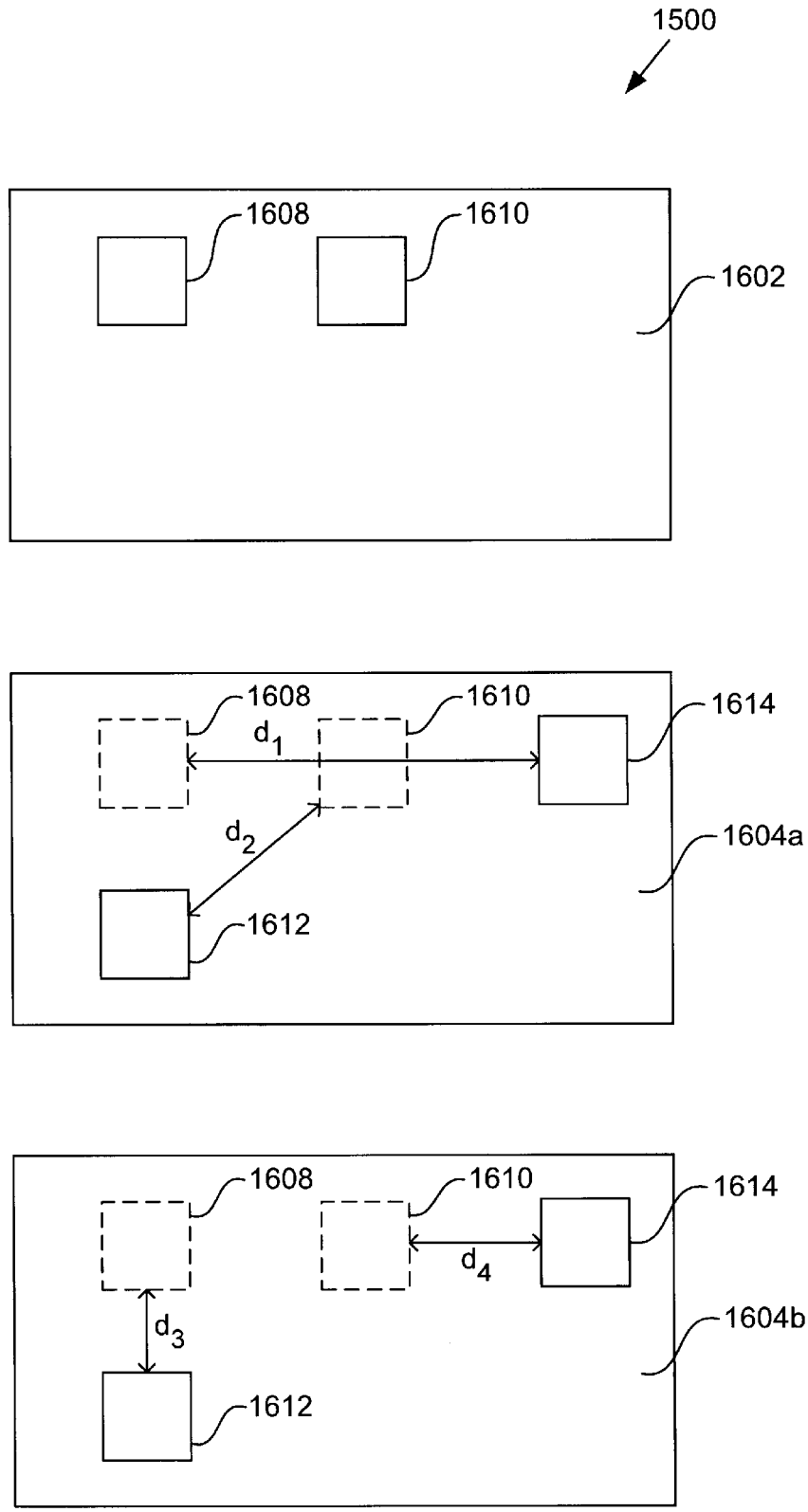
FIG. 16 is a diagrammatic representation of two successive frames having multiple non-coded objects that are to be matched in accordance with one embodiment of the present invention.

After the objects are located for each frame, the objects are matched or linked in successive frames in operations 1502 through 1508. FIG. 16 is a diagrammatic representation of two successive frames having multiple non-coded objects that are to be matched in accordance with one embodiment of the present invention. FIG. 16 will be described in conjunction with the flowchart of FIG. 15. In general, particular objects are identified and distinguished from all other objects in each successive frame so that each object's movement may be accurately tracked from frame to frame.

In FIG. 16, a first frame 1602 has a first object 1608 and a second object 1610. In a second frame 1604, the objects 1608 and 1610 have moved to one of two positions 1612 and 1614. For example, object 1612 of the second frame 1604 is either object 1608 or 1610 of the first frame 1602. The second frame is represented by two possible interpretations, 1604a and 1604b. The first interpretation 1604a represents the matching of object 1608 of the first frame 1602 to object 1614 of the second frame 1604, while the second interpretation 1604b represents the matching of the object 1608 of the first frame 1602 with the object 1612 of the second frame 1604.

To track the objects from the first frame 1602 to the second frame 1604, initially, in operation 1502 each object from the first frame 1602 is matched with an object in the second frame 1604. For example, interpretation 1604a is chosen as the second frame. Object 1608 of the first frame 1602 is matched with object 1614 of the second frame 1604. Likewise, object 1610 of the first frame 1602 is matched with object 1612 of the second frame 1604. Next, in operation 1404, a sum of the distances between the paired objects is calculated. For interpretation 1604a, the sum is equal to distance d1 plus d2. For example, distance d1 represents the distance that object 1608 would have moved if object 1608 is identified as object 1614.

After the sum of distances between matched objects is calculated for one set of paired objects or interpretation (e.g., 1604a or 1604b), it is determined whether any other combinations of paired objects is possible in operation 1506. That is, it is determined whether it is possible to match each of the objects of the first frame to different objects in the second frame. If it is possible to match different objects, then the operation 1502 is repeated for a different interpretation (e.g., 1604b) of the second frame. For instance, object 1608 of the first frame 1602 is matched with the object 1612 of the second frame 1604. Next, in operation 1404, a second sum is calculated for the new matched combinations as shown in interpretation 1604b (e.g., d3 plus d4).

If it is determined that it is not possible to match each of the objects of the first frame to different objects of the second frame, the process 1506 proceed to operation 1508. In the example of FIG. 15, no other possible matches are possible, so operation 1508 is executed. In operation 1508, it is determined which combination results in a minimum sum. In other words, it is determined which combination of matched pairs results in the least amount of distance moved.

As shown in FIG. 16, when object 1608 is matched with object 1612 of the second frame 1604 and object 1610 is matched with the object 1614 of the second frame 1604, the sum is equal to d3 plus d4 as shown in interpretation 1604b. This sum is, of course, less than the sum of the distances (d1 plus d2) if object 1608 were matched with object 1614 of the second frame 1604a and object 1610 were matched with object 1612 of the second frame 1604a. Thus, it is concluded that object 1608 of the first frame 1602 is the same as object 1612 of the second frame, and has moved distance d1. This tracking method has the advantage of being a fast and effective way of tracking non-coded objects.

Although the foregoing invention has been described in some detail for purposes of clarity of understanding, it will be apparent that certain changes and modifications may be practiced within the scope of the appended claims. For example, the techniques for tracking coded objects of the present invention may be implemented by comparing RGB values, rather than luminosity values. By way of another example, the techniques for tracking non-coded objects may compare sizes or colors of objects of a first frame to sizes or colors of objects of a second frame. Accordingly, the present embodiments are to be considered as illustrative and not restrictive, and the invention is not to be limited to the details given herein, but may be modified within the scope and equivalents of the appended claims.

What is claimed is:

1. A method of characterizing a coded object having a plurality of regions, the method comprising:

comparing a luminosity value of a first region of the coded object to a luminosity value of a second region of the coded object, wherein the second region's color is known; and determining the first region's color based on the comparison of the first and second region's luminosity values.

2. A method as recited in claim 1, further comprising:

comparing luminosity values of all other regions of the coded object to the second region's luminosity value;

determining each region's color based on the comparison of each region's luminosity value to the second region's luminosity value, wherein the plurality of region colors form a pattern; and matching the pattern of region colors to a known coded object's pattern of region colors to thereby determine the coded object's identity.

3. A method as recited in claim 1, wherein the second region's color is known to be white, it is determined that the first region's color is white when the first region's luminosity value is not less than the second region's luminosity value by more than a predetermined constant k, and it is determined that the first region's color is black when the first region's luminosity value is less than the second region's luminosity value by more than a predetermined value.

4. A method as recited in claim 1, further comprising selecting the second region from two reference regions that are known to be white, the reference region having the highest luminosity value of the two reference regions being selected as the second region.

5. A method as recited in claim 4, further comprising:

comparing the first region's luminosity value to the non-selected reference region, wherein it is only determined that the first region's color is black when the first region's luminosity value is also less than the nonselected reference region's luminosity value.

6. A method as recited in claim 1, wherein
the second region's color is known to be black,
it is determined that the first region's color is white when the first region's luminosity value is greater than the second region's luminosity value by more than a predetermined value, and
it is determined that the first region's color is black when the first region's luminosity value is not greater than the second region's luminosity value by more than a predetermined value.

7. A method as recited in claim 1, further comprising selecting the second region from two reference regions that are known to be black, the reference region having the lowest luminosity value of the two reference regions being selected as the second region.

8. A method as recited in claim 4, further comprising:
comparing the first region's luminosity value to the nonselected reference region,
wherein it is only determined that the first region's color is white when the first region's luminosity value is also greater than the nonselected reference region's luminosity value.

9. A method as recited in claim 1, wherein
the first region's color is known to be selected from a group consisting of black and white and the second region's color is known to be an opposite of the first region's color,
it is determined that the first region's color is black when the first region's luminosity value is not greater than the second region's luminosity value, and
it is determined that the first region's color is white when the first region's luminosity value is greater than the second region's luminosity value.

10. A method as recited in claim 1, further comprising:
comparing the first region's luminosity value to a luminosity value of a third region of the coded object, wherein the third region's color is known,
wherein the second region's color is known to be white and the third region's color is known to be black,
it is determined that the first region's color is black when a difference between the luminosity values of the first and second regions is greater than a difference between the luminosity values of the first and third regions, and
it is determined that the first region's color is white when a difference between the luminosity values of the first and second regions is not greater than a difference between the luminosity values of the first and third regions.

11. A method of characterizing a coded object having a first region, the first region having a first subregion having a first color and a second subregion having second color that differs from the first color, wherein the first subregion is movable over a portion of the second subregion, the method comprising:
when the second subregion has a white color, comparing the first regions luminosity values at a plurality of positions and defining the first subregion's position as the position of the minimum luminosity value within the first region; and
when the second subregion has a black color, comparing the first regions luminosity values at a plurality of positions and defining the first subregion's position as the position of the maximum luminosity value within the first region.

12. A method of characterizing a coded object having a white region and a black region, the first and second regions being substantially adjacent, an object being partially within the first region and partially within the second region, the object portion within the first region being white, the object portion within the second region being black, the method comprising:
subtracting luminosity values of the white region from luminosity values of the black region at a plurality of positions; and
defining the object's position as the position of the luminosity value pair that has a minimum difference.

13. A method of characterizing a coded object having a first region and a second region, the first region a majority of subregions with a first color and the second regions having a majority of subregions with a second color that differs from the first color, the method comprising:
(a) comparing luminosity values of a selected subregion within the first region to each subregion within the second region;
(b) when a number of luminosity values of the subregions within the second region differ from a luminosity value of the selected subregion by more than a predetermined value, defining the selected subregion as a reference subregion; and
(c) when a number of luminosity values of the subregions within the second region does not differ from a luminosity value of the selected subregion by more than a predetermined value, selected a next subregion within the first region and repeating steps (a) and (b) if there is a next subregion within the first region.

14. A method as recited in claim 13, further comprising when there is not a next subregion within the first region, defining a third and fourth region within the coded object as the first and second regions and repeating steps (a) through (c).

15. A coded object comprising a plurality of bit objects that each have at least a first region adjacent to a second region, the first region having a different color than the second region, and the relative positions of the first and second region's color for each of the bit object indicating an identity of the coded object.

16. A coded object as recited in claim 15, further comprising a center object having a predefined color so that the coded object's presence is detectable via the center object.

17. A coded object as recited in claim 16, further comprising a reference object by which the coded object's orientation is determinable from the center object's and reference object's relative positions.

18. A coded object as recited in claim 17, wherein the center object, the subregions of the bit objects, and the reference objects' colors are selected from a group consisting of black and white.

19. A coded object as recited in claim 15, wherein the subregions of the bit objects' colors are selected from a group consisting of black and white.

20. A coded object as recited in claim 15, further comprising a movable object that is capable of being moved over a third region of the coded object, the movable object's color being different than the third region's color to facilitate determination of the movable object's position relative to the third region.

21. A coded object as recited in claim 20, wherein the subregions of the bit objects and the movable objects' colors are selected from a group consisting of black and white.

22. A coded object as recited in claim 21, wherein half of the movable object is white and another half of the movable object is black, the white half of the movable object being movable over a black half of the third region and the black half of the movable object being movable over a white half of the third region.

23. A coded object as recited in claim 20, wherein a first half of the movable object is movable over a first half of the third region having a same color as a second half of the movable object, the second half of the movable object being movable over a second half of the third region that has a same color as the first half of the movable object.

24. A computer readable medium containing instructions for characterizing a coded object having a plurality of regions, the computer readable medium comprising:

computer code for comparing a luminosity value of a first region of the coded object to a luminosity value of a second region of the coded object, wherein the second region's color is known; and computer code for determining the first region's color based on the comparison of the first and second region's luminosity values.

25. A computer readable medium as recited in claim 24, wherein the second region's color is known to be white, it is determined that the first region's color is white when the first region's luminosity value is not less than the second region's luminosity value by more than a predetermined constant k, and it is determined that the first region's color is black when the first region's luminosity value is less than the second region's luminosity value by more than a predetermined value.

26. A computer readable medium as recited in claim 25, the computer readable medium further comprising computer code for selecting the second region from two reference regions that are known to be white, the reference region having the highest luminosity value of the two reference regions being selected as the second region.

27. A computer readable medium as recited in claim 26, the computer readable medium further comprising:

computer code for comparing the first region's luminosity value to the nonselected reference region, wherein it is only determined that the first region's color is black when the first region's luminosity value is also less than the nonselected reference region's luminosity value.

28. A computer readable medium as recited in claim 24, wherein the first region's color is known to be selected from a group consisting of black and white and the second region's color is known to be an opposite of the first region's color, it is determined that the first region's color is black when the first region's luminosity value is not greater than the second region's luminosity value, and it is determined that the first region's color is white when the first region's luminosity value is greater than the second region's luminosity value.

29. A computer readable tedium as recited in claim 24, the computer readable medium further comprising:

computer code for comparing the first region's luminosity value to a luminosity value of a third region of the coded object, wherein the third region's color is known, wherein the second region's color is known to be white and the third region's color is known to be black, it is determined that the first region's color is black when a difference between the luminosity values of the first and second regions is greater than a difference between the luminosity values of the first and third regions, and it is determined that the first region's color is white when a difference between the luminosity values of the first and second regions is not greater than a difference between the luminosity values of the first and third regions.

30. A computer readable medium containing instructions for characterizing a coded object having a first region, the first region having a first subregion having a first color and a second subregion having second color that differs from the first color, wherein the first subregion is movable over a portion of the second subregion, the computer readable medium comprising:

computer code for comparing the first regions luminosity values at a plurality of positions and defining the first subregion's position as the position of the minimum luminosity value within the first region when the second subregion has a white color; and computer code for comparing the first regions luminosity values at a plurality of positions and defining the first subregion's position as the position of the maximum luminosity value within the first region when the second subregion has a black color.

31. A computer readable medium containing instructions for characterizing a coded object having a white region and a black region, the first and second regions being substantially adjacent, an object being partially within the first region and partially within the second region, the object portion within the first region being white, the object portion within the second region being black, the computer readable medium comprising:

computer code for subtracting luminosity values of the white region from luminosity values of the black region at a plurality of positions; and computer code for defining the object's position as the position of the luminosity value pair that has a minimum difference.

32. A computer readable medium containing instructions for characterizing a coded object having a first region and a second region, the first region a majority of subregions with a first color and the second regions having a majority of subregions with a second color that differs from the first color, the computer readable medium comprising:

computer code for (a) comparing luminosity values of a selected subregion within the first region to each subregion within the second region;

computer code for (b) when a number of luminosity values of the subregions within the second region differ from a luminosity value of the selected subregion by more than a predetermined value, defining the selected subregion as a reference subregion; and computer code for (c) when a number of luminosity values of the subregions within the second region does not differ from a luminosity value of the selected subregion by more than a predetermined value, selected a next subregion within the first region and repeating steps (a) and (b) if there is a next subregion within the first region.

* * * * *

UNITED STATES PATENT AND TRADEMARK OFFICE
CERTIFICATE OF CORRECTION

PATENT NO. : 6,151,564 Page 1 of 1
APPLICATION NO. : 09/017450
DATED : November 21, 2000
INVENTOR(S) : Vescovi et al.

It is certified that error appears in the above-identified patent and that said Letters Patent is hereby corrected as shown below:

On the face page, under field (22), in column 1, insert -- Related U.S. Application Data -- Insert field -- (63) Continuation-in-part of application No. 08/675,104, filed on Jul. 3, 1996, now Pat. No. 5,953,686, and claims priority to application No. 60/001,875, filed on Aug. 3, 1995 --.

In column 1, line 6, after "This application" insert -- is a continuation-in-part of application No. 08/675,104, filed on Jul. 3, 1996, now Pat. No. 5,953,686, and --.

In column 1, line 6, delete "08/675,104 filed Jul. 3, 1995 entitled, "Video Camera Based Computer Input System With Interchangeable Physical Interface by Piernot, et al.," and insert -- 60/001,875, filed on Aug. 3, 1995 --, therefor.

Signed and Sealed this

Thirteenth Day of July, 2010

David J. Kappos
*Director of the United States Patent and Trademark Office*